United States Patent
Yeh et al.

(10) Patent No.: US 8,562,915 B2
(45) Date of Patent: Oct. 22, 2013

(54) PROCESSES AND APPARATUS FOR POLYMER FINISHING AND PACKAGING

(75) Inventors: Richard Cheng-Ming Yeh, Bellaire, TX (US); Vetkav Rajagopalan Eswaran, Houston, TX (US); Edgar Peter Hentsch, Singapore (SG); Oscar Kearney Broussard, III, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 241 days.

(21) Appl. No.: 12/972,110

(22) Filed: Dec. 17, 2010

(65) Prior Publication Data
US 2011/0172382 A1 Jul. 14, 2011

Related U.S. Application Data

(60) Provisional application No. 61/294,876, filed on Jan. 14, 2010.

(51) Int. Cl.
*B01J 19/00* (2006.01)
*C08F 6/00* (2006.01)

(52) U.S. Cl.
USPC ............................................. 422/131; 526/72

(58) Field of Classification Search
USPC ........................................................ 422/131
See application file for complete search history.

(56) References Cited

U.S. PATENT DOCUMENTS

| | | | |
|---|---|---|---|
| 2,862,243 A | 12/1958 | Farr et al. | |
| 3,207,818 A | 9/1965 | Marshall | |
| 3,575,214 A * | 4/1971 | Bindel | 138/107 |
| 3,804,423 A | 4/1974 | Booy | |
| 3,912,698 A | 10/1975 | Shurts | |
| 4,032,271 A * | 6/1977 | Gasior | 425/10 |
| 4,385,016 A * | 5/1983 | Gwinn | 264/37.26 |
| 4,428,473 A * | 1/1984 | Schalkhauser | 198/367 |

(Continued)

FOREIGN PATENT DOCUMENTS

| | | |
|---|---|---|
| EP | 0 254 826 | 2/1988 |
| EP | 0 695 719 | 2/1996 |

(Continued)

OTHER PUBLICATIONS

T. G. Gutowski et al., "A Low-Energy Solvent Separation Method," Polymer Engineering and Science, Mar. 1983, vol. 23, No. 4, pp. 230-237.

(Continued)

*Primary Examiner* — Jennifer A Leung

(57) ABSTRACT

Provided are apparatus and methods relating to the finishing line of a continuous solution polymerization plant. In one aspect, an apparatus includes a pelletizer having cooling liquid, e.g., water or aqueous solution, into which is added a pelletization aid. In another aspect, the apparatus comprises means to remove residual polymer particles from the pelletizer cooling liquid. In a further aspect, the apparatus comprises conduits of at least 50 m in length for carrying propellant cooling liquid from the pelletizer to a drying apparatus. The residence time of the pellets in the cooling liquid may be 10 seconds or more. In a further aspect, a drying apparatus is provided for the pellets which comprises first and second drying zones. In a further aspect, a pneumatic conveyor is provided for carrying pellets to a packaging apparatus. In a further aspect, a packaging apparatus is provided comprising a blender silo.

7 Claims, 6 Drawing Sheets

(56) References Cited

U.S. PATENT DOCUMENTS

| | | | |
|---|---|---|---|
| 4,606,873 A * | 8/1986 | Biglione et al. | 264/53 |
| 4,850,835 A * | 7/1989 | Rudolph | 425/67 |
| 5,306,556 A | 4/1994 | Rowland | |
| 6,126,836 A | 10/2000 | Ding et al. | |
| 6,575,722 B1 * | 6/2003 | Whitman | 425/68 |
| 6,881,800 B2 | 4/2005 | Friedersdorf | |
| 7,163,989 B2 | 1/2007 | Friedersdorf | |
| 7,192,545 B2 * | 3/2007 | Ekart et al. | 264/211.13 |
| 2004/0024146 A1 | 2/2004 | Friedersdorf | |
| 2005/0154183 A1 | 7/2005 | Ekart et al. | |
| 2008/0234443 A1 | 9/2008 | Kiss et al. | |
| 2008/0234445 A1 * | 9/2008 | Hamano et al. | 526/65 |
| 2010/0152396 A1 | 6/2010 | Fleury et al. | |

FOREIGN PATENT DOCUMENTS

| | | |
|---|---|---|
| EP | 1 003 814 | 5/2000 |
| GB | 889088 | 2/1962 |
| WO | WO 92/14766 | 9/1992 |
| WO | WO 94/00500 | 1/1994 |
| WO | WO 98/02471 | 1/1998 |
| WO | 01/46273 | 6/2001 |
| WO | 02/34795 | 5/2002 |
| WO | WO 2004058480 A1 * | 7/2004 |
| WO | 2006/077214 | 7/2006 |

OTHER PUBLICATIONS

S. J. Han et al., "Short Chain Branching Effect on the Cloud Point Pressures of Ethylene Copolymers in Subcritical and Supercritical Propane," Macromolecules 1998, vol. 31, pp. 2533-2538.

C. A. Irani et al., "Lower Critical Solution Temperature Behavior of Ethylene Propylene Copolymers in Multicomponent Solvents," Journal of Applied Polymer Science 1986, vol. 31, pp. 1879-1899.

Mark A. McHugh et al., "Separating Polymer Solutions with Supercritical Fluids," Macromolecules 1985, vol. 18, Issue 4, pp. 674-680.

Hajime Tanaka, "Critical dynamics and phase separation kinetics in dynamically asymmetric binary fluids: New dynamic universality class for polymer mixtures or dynamic crossover?," Journal of Chemical Physics Apr. 1, 1994, 100 (7), pp. 5323-5337.

* cited by examiner

PROCESSES AND APPARATUS FOR POLYMER FINISHING AND PACKAGING

CROSS REFERENCE TO RELATED APPLICATIONS

This application claims priority to and the benefit of U.S. Ser. No. 61/294,876, filed Jan. 14, 2010. This application is related to the following concurrently filed U.S. Provisional Applications: U.S. Ser. No. 61/294,871, U.S. Ser. No. 61/294,885, and U.S. Ser. No. 61/294,891, each of which was filed Jan. 14, 2010 and are incorporated herein by reference.

FIELD OF INVENTION

Described in various aspects are processes and apparatuses for polymer manufacture and processing. The present disclosure especially to such processes and apparatus for making soft polymers. The present disclosure furthermore relates especially to continuous solution polymerization processes and apparatus.

BACKGROUND OF INVENTION

In many polymer manufacturing and processing operations it is necessary to transform a polymer solution or a polymer melt into solid polymer pellets or crumbs for packaging in sacks or other containers or bales. Such processes are generally referred to as polymer finishing and packaging and the associated apparatus may be referred to as a polymer finishing and packaging line. Thus, in polymer manufacture, the polymer may be produced directly as a polymer melt or alternatively may be produced as particles in a slurry polymerization which are then melted to form a polymer melt or as a polymer solution in a solvent from which the solvent is evaporated away while the polymer is left behind either as crumbs or as a melt which is then subject to finishing and packaging operations. In polymer processing operations of similar need arises, for example, where two or more different polymers have been blended or are being combined with non-polymer components such as a colorant or filler. One process of interest which produces polymer as a melt is the continuous solution polymerization of olefins.

Continuous solution polymerization processes generally involve the addition of catalyst to a monomer and solvent mixture. The mixture may be back-mixed giving a uniform polymer in an environment with substantially no concentration gradients. WO 94/00500 (Pannell et al.), incorporated herein by reference, describes a solution polymerization using metallocene in a continuous stirred tank reactor or multiple reactors which may be in a series or a parallel reactor arrangement to make a variety of products.

The heat of the polymerization reaction can be absorbed by the polymerization mixture, causing an exotherm. Alternatively, or in addition, the heat of reaction can be removed by a cooling system, by external cooling of the walls of the reactor vessel, or by internally arranged heat exchange surfaces cooled by a heat exchange fluid, or by circulating the reactants through an external heat exchanger, or by allowing some of the solvent to evaporate.

In the course of the polymerization, typically, a predominant amount (over 50 mol %) of the monomer and/or co-monomers is consumed and the polymer formed is dissolved in the solvent. The higher the concentration of the polymer, the higher the viscosity of the polymerization reaction mixture containing the polymer, solvent, and unreacted components. The mixture passes from the polymerization reactor to a finishing section in which polymer, solvent and unreacted monomers are separated. In the course of finishing, solvent and unreacted monomer are progressively removed from the polymerization mixture until the polymer can be formed into solid pellets or bales ready for packaging. The pellets or bales are then conveyed to a packaging line for packaging, for example in sacks or large or other suitable containers. The separated solvent and monomer can be recycled to the polymerization reactor.

The finishing section may also comprise a vacuum devolatilizer, in which the molten polymer is exposed to a vacuum while being intensively agitated to draw off volatiles such as solvent and residual monomer, in order to reduce the level of volatiles in the finished polymer to a desired level.

U.S. Pat. Nos. 6,881,800 and 7,163,989, both of which are incorporated herein by reference, describe a process and apparatus for the continuous solution polymerization of olefins including ethylene, propylene and other olefin comonomers. The polymerization reaction takes place under pressure in one or more polymerization reactors, and then the effluent from the reactor or reactors is treated in a finishing section with a catalyst killer and then heated in one or more heat exchangers before being subject to a pressure drop which causes the effluent to phase separate into a polymer-rich phase and a polymer-lean phase. Those phases are separated, with the polymer-lean phase being purified and recycled to be used as solvent. The polymer-rich phase is subject to further separation and purification stages, including passage through a vacuum devolatilizer. Following the vacuum devolatilization, the polymer is formed into pellets and/or bales for storage or shipping. The process is suitable for the manufacture of a range of different polymer types.

In some solution processes (see WO 98/02471 Kolthammer), incorporated herein by reference, the polymerized mixture is flashed off in two stages, whereby the solvent and unreacted monomer are converted to a vapor phase. Efficient extraction of solvent, etc., requires low vapor pressures and vapor phase compression or condensation followed by pumping for subsequent separation stages. Pumping is used to convey polymer from flash separation stages to a final devolatilizing extruder.

In solution plants, solvent selection, operating temperatures, and purification systems have to be designed for a particular operating window for the desired polymerization process. Metallocene catalysts permit a wide variety of polymers to be made in terms of comonomer content, molecular weight, etc. Optimum production performance for a given type of polymer may be obtained with a particular catalyst within a specific operating window. Different types of polymer may then have to be produced in different plant lay-outs. There is, therefore, a need for a plant design that can be used more flexibly for different types of polymers and catalysts, and which also can be adapted more easily to evolving catalyst technologies than current designs of solution polymerization plants.

Some polymers produced using solution polymerization are soft and tacky, and are therefore prone to handling problems. There is therefore a need for plants and processes which allow improved handling of such soft polymers.

Some polymers which are generally not subject to handling problems caused by tackiness are nonetheless slow to crystallize from the melt, and are therefore subject to handling problems until crystallization has reached a significant level. There is a need for improved plant and processes for handling such slow-crystallizing polymers.

Some polymers are prone to oxidation by atmospheric oxygen, giving rise to gels and other imperfections in the finished product. There is also a need to reduce such gels and other contaminants.

Polymer manufacturing and processing plants are often located in regions having hot and humid climates, and can suffer from packaging problems caused by the high humidity. There is a need for plant and processes which offer an improved way of handling polymer in humid climates.

For additional background, see also WO 94/00500 and WO 92/14766, both of which are incorporated herein by reference.

SUMMARY OF INVENTION

Provided are apparatus and methods relating to the finishing line of a continuous solution polymerization plant. In one aspect, an apparatus includes a pelletizer having cooling liquid, e.g., water or aqueous solution, into which is added a pelletization aid. In another aspect, the apparatus comprises means to remove residual polymer particles from the pelletizer cooling liquid. In a further aspect, the apparatus comprises conduits of at least 50 m in length for carrying propellant cooling liquid from the pelletizer to a drying apparatus. The residence time of the pellets in the cooling liquid may be 10 seconds or more. In a further aspect, a drying apparatus is provided for the pellets which comprises first and second drying zones. In a further aspect, a pneumatic conveyor is provided for carrying pellets to a packaging apparatus. In a further aspect, a packaging apparatus is provided comprising a blender silo.

DETAILED DESCRIPTION OF THE ILLUSTRATIVE EMBODIMENTS

Figure 1:
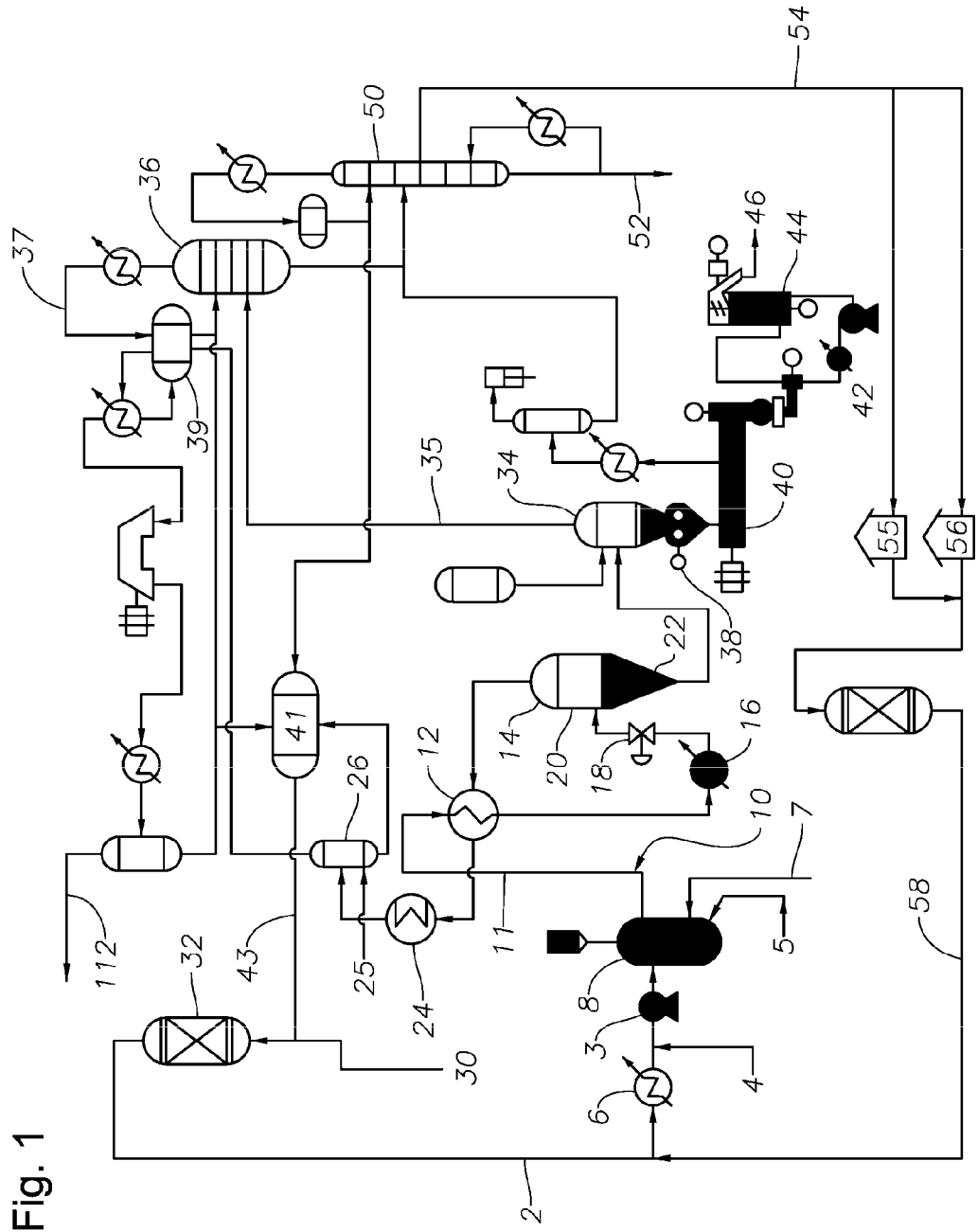
FIG. 1 shows a schematic lay-out of a plant for the continuous solution polymerization of olefins.

In a first aspect, provided is a pelletizing apparatus for injecting a polymer into cooling liquid thereby forming pellets which comprises means to add a pelletization aid to the cooling liquid.

The polymer will typically be in molten form, and will be at a temperature higher than that of the cooling liquid, e.g., at least 100° C. higher than the temperature of the cooling liquid. Optionally, the polymer is a molten polyolefin. Optionally, the polymer is a concentrated polymer phase produced in a polymer manufacturing plant.

The cooling liquid as used herein is water, an aqueous solution, an alcohol, or an alcohol-based solution, a hydrocarbon, a hydrocarbon blend, or combinations thereof. The cooling liquid includes any conventional material having a lower temperature than the polymer that is used to cool the polymer feed. Preferably, the cooling liquid is water or an aqueous-based solution. More preferably, the cooling liquid is water.

The pelletizing aid as used herein refers to any material that is retained on the polymer pellet surface that reduces polymer pellet surface tackiness compared to a polymer pellet surface that does not include a pelletizing aid. The pelletizing aid substantially or partially surrounds the pellet surface. The pelletizing aid includes a single material or compounded material. The pelletization aid may be a liquid or a solid. Preferably, the pelletizing aid is a conventional thermoplastic polymer, tackifying resin, compound including alkali metals or alkaline earth metals, or combinations thereof.

Optionally, the pelletization aid is a finely divided solid, such as a powder. Optionally, the powder is dispersed in a carrier liquid such as water to form a slurry. Such a slurry may be easily pumped and added to the cooling liquid. Optionally, the pelletization aid is a metal stearate, such as zinc stearate or calcium stearate. Preferably, the metal stearate is calcium stearate. Optionally, the pelletization aid is an aqueous emulsion or dispersion of a polymer, for example, a polyethylene, or of a wax, for example, carnauba wax. Suitable emulsions/dispersions include Michem™ emulsions/dispersions ML103D, ME52137F, Michemgard™ 349 (those being emulsions of polyethylene in water) and MW13025E (Carnauba wax emulsion). Optionally, the pelletization aid is present in the cooling liquid at a concentration in the range of from 10 to 5000, preferably from 50 to 3000, more preferably from 200 to 3000 parts per million by weight. Such concentrations of calcium stearate in the cooling liquid have been found in many cases to give rise to a level of around 1 ppm to 500 ppm by weight in the finished, dried polymer pellets. Optionally, the pelletization aid is present on the dried pellets in an amount in the range of from 5 to 500 ppm by weight, preferably from 10 to 50 ppm by weight. Soft, amorphous polymers typically benefit from relatively high levels of pelletization aid, for example, in the range of 1 to 1000 ppm, optionally from 100 to 500 ppm by weight. For crystalline and high density grades, less pelletization aid is usually used, for example, from 10 to 100 ppm by weight.

In a second aspect, provided is a polymerization plant comprising: a reactor for the polymerization of one or more olefin monomers to form a polymer-containing polymerization reaction mixture, a separation apparatus for the separation of volatile components from the polymer-containing polymerization reaction mixture, a pelletizer apparatus according to the first aspect of inventions described herein, and a drying apparatus to separate the pellets from the cooling liquid.

In a third aspect, provided is a method of pelletizing a polymer comprising the step of injecting a polymer into cooling liquid to form pellets wherein the cooling liquid comprises a pelletization aid and the pelletization aid is deposited on the surfaces of the pellets and which further comprises the step of separating the pellets from the cooling liquid and drying them.

A wide variety of conventional pelletization aids is known for use in improving the handling properties of polymer pellets. Pelletization aids are particularly known for use with soft polymers such as elastomers or adhesives, and are typically added directly to the polymer pellets. In the apparatus of the first aspect, in contrast, the pelletization aid is added to the cooling liquid used in the pelletizer and deposits from that cooling liquid onto the surfaces of the pellets as they form. The pelletization aid therefore directly contacts the pellets as soon as they are formed thus reducing the chances of pellet agglomeration. Furthermore, the addition of the pelletization aid to the pelletizer cooling liquid can reduce the formation of unpleasant and hazardous dust as compared to the direct addition of the pelletization aid to the pellets.

The polymer may be any polymer (optionally a polymer melt) which is desired to form into pellets using an underwater pelletizer. The polymer will typically be at an elevated temperature. The pelletizing apparatus may be any suitable pelletizer for transforming the polymer into pellets and such apparatus is well known to the person skilled in the art. Generally, pelletization systems include a chamber having a screw and/or a gear pump for driving the polymer through a die plate and a moving blade in contact with the die plate for chopping the polymer extruded through the die plate into pellets. Die plate and block are submerged in a chamber which is filled with cooling liquid and the pellets are cooled by the cooling liquid as they are carried away from the die plate.

The pelletization aid may be added to the cooling liquid of the pelletizer in any suitable manner and by any suitable apparatus. Preferably, the means to add the pelletization aid comprises a pump such as a metering pump to pump a slurry dispersion of the pelletization aid into the cooling liquid.

Optionally, the pelletizing apparatus comprises means to monitor the concentration of pelletization aid in the cooling liquid and control means to control the means, such as a computer, to add the pelletization aid to the cooling liquid in order to maintain the concentration of pelletization aid in the cooling liquid within a desired range.

Monitoring and controlling the level of pelletization aid in the cooling liquid provides a simple way of controlling the amount of pelletization aid deposited on the pellets and the desired range of concentration of the pelletization aid in the cooling liquid will typically be chosen with a view to achieving the desired amount of pelletization aid deposited on the pellets.

Any suitable means may be used to monitor the level of pelletization aid in the cooling liquid. The control means for controlling the means to add the pelletization aid to the cooling liquid will be any suitable control device, for example, a computer or microprocessor which is connected to the means to monitor the concentration of the pelletization aid and to a pump for pumping the pelletization aid into the cooling liquid.

The apparatus and plant of the first and second aspects preferably comprise a reservoir containing the pelletization aid which communicates with the means for adding the pelletization aid to the cooling liquid.

Preferably, the means to measure the concentration of the pelletization aid in the cooling liquid comprises a turbidity meter. Turbidity measurement provides a simple and robust way of monitoring the concentration in the cooling liquid of any pelletization aid which causes turbidity in the cooling liquid.

Preferably, the apparatus and plant of the first and second aspects also comprises a pump for pumping the cooling liquid and the pellets from the pelletizer apparatus to a drying apparatus for separating the pellets from the cooling liquid and drying them. For example, the pellets may be separated from the pelletizer cooling liquid in a spin dryer and then passed through another dryer such as a fluidized bed dryer to dry off any remaining surface liquid.

Optionally, the cooling liquid is arranged to be re-circulated from the drying apparatus back to the pelletizer. In that embodiment, the cooling liquid will typically flow back to the pelletizer through one or more conduits optionally including one or more storage tanks, filter screens and other equipment.

The apparatus, plant, and method of the first, second and third aspects are applicable to the manufacture and processing of a wide variety of polymers. The polymer is preferably a polyolefin or a blend of polyolefins either made in a single reactor or made in multiple reactors arranged in series or multiple reactors arranged in parallel. Optionally, the polyolefins made in each of the reactors arranged in series or in parallel may be derived using a single type of olefin or a combination of several monoolefins and several diolefins. Optionally, the polyolefin is a polyolefin prepared by solution polymerization, especially continuous solution polymerization of a feed of one or more olefin monomers in a hydrocarbon solvent. Optionally, one of the olefin monomers is a diolefin. The polymer is optionally a soft polymer. Optionally, the dried polymer pellets have a Shore A hardness of no more than 60, optionally no more than 50, optionally no more than 45 immediately after exiting the apparatus for separating the polymer particles from the cooling liquid e.g. the spin dryer. In many cases, the Shore A hardness of the polymer will increase to higher levels during passage through the finishing and packaging line and upon storage. In some cases, however, the polymer pellets will be so soft on exiting the separator apparatus that the test needle travels into and through the pellets, giving a Shore A value of zero.

Optionally, immediately after being separated from the cooling liquid the polymer particles have a Vicat A softening point of no more than 60° C., optionally no more than 50° C.

The polymer may be an elastomer or rubber. The polymer may be a plastomer. The polymer may be an ethylene-propylene-diene polymer. The diene may be ethylidene norbornene. The polymer is optionally a polymer comprising a blend of isotactic polypropylene and an alpha-olefin/propylene copolymer, for example, as described in U.S. Pat. No. 6,635,715, incorporated herein by reference.

In a fourth aspect, provided is an apparatus for removing residual polymer particles from pelletizer cooling liquid comprising: a flotation tank having an inlet for the cooling liquid, and a surface outlet arranged in the flotation tank to take cooling liquid from the surface of the cooling liquid in the flotation tank, the arrangement of the inlet and surface outlet and the size of the flotation tank being such that turbulence in the cooling liquid is sufficiently low to allow residual polymer particles to float to the surface of the cooling liquid in the flotation tank thereby causing cooling liquid flowing into the surface outlet to have a higher concentration of residual polymer particles than the average concentration of residual polymer particles in the cooling liquid in the tank, a separation device for separating residual polymer particles from cooling liquid flowing through the surface outlet, to form filtered cooling liquid, and means for returning the filtered cooling liquid directly or indirectly to the pelletizer.

In a fifth aspect, provided is a method of separating residual polymer particles from pelletizer cooling liquid comprising the steps of: introducing the pelletizer cooling liquid into a flotation tank, allowing residual polymer particles to float upwards in the flotation tank thereby causing the concentration of residual polymer particles at the surface of the cooling liquid in the flotation tank to be greater than the average concentration of residual polymer particles in the cooling liquid in the flotation tank, abstracting cooling liquid from the surface region of the flotation tank and separating the residual polymer particles from the abstracted cooling liquid to form filtered cooling liquid, and recycling the filtered cooling liquid to the pelletizer, optionally via the flotation tank.

Without being limited by theory, it is believed that residual polymer particles which are present in the cooling liquid of the pelletizer after the majority of the polymer pellets have been separated in the dryer are one source of imperfections in the finished polymer, especially of contaminants which result in optical imperfections in films or extruded or milled tapes or ribbons made from the finished polymer. Polymer particles that are smaller in size than the majority of the polymer pellets are thought to be generated in the pelletizer chamber, for example, due to melt fracture when the polymer is extruded through the die holes. Polymer particles may also be broken down into smaller particles by impact with the pipe walls as they are conveyed in the stream of flowing cooling liquid. Small polymer particles are also thought to be generated in the drying apparatus.

The term "residual polymer particles" refers to polymer particles that are not separated out from the cooling liquid by the normal methods, for example, because they are small enough to pass through the screens or because of some malfunction in the spin dryer, and which are carried in the pelletizer cooling liquid.

The size range of the residual polymer particles extends from the size of the original polymer pellet down to very fine particles, for example, having a diameter of less than 1 mm, optionally less than 500 µm. Residual polymer particles may be generated in the pelletizer cooling liquid by breakage of polymer pellets, and, if unchecked, may re-circulate in the pelletizer cooling liquid for an extended period before eventually being caught up in the pellet drying apparatus and sent for packaging with the polymer pellets. Because of their small size and high surface area to volume ratio the smaller residual polymer particles are prone to oxidation and cross-linking while re-circulating in the cooling liquid. Also, as various changes of polymer grade take place, there may be a build up in the pelletizer cooling liquid of residual polymer particles of differing polymer grades, and consequently of differing refractive indices. In some cases, because of cross-linking or because of refractive index differences, the residual polymer particles may give rise to optical imperfections in polymer films made from the polymer pellets. Some of the contaminants may be opaque or discolored.

In some instances, insects, algae, and other contaminants from the general environment may enter the pelletizer cooling or conveying liquid system and these are also removed by the apparatus described above.

In the apparatus and method of the fourth and fifth aspects the cooling liquid is passed through a flotation tank which is large compared to the flow rate of the cooling liquid thereby resulting in a low level of turbulence, under which conditions the residual polymer particles can float to the surface of the cooling liquid in the flotation tank and be carried out through the surface outlet to the separation device. Typically, the flotation tank is so sized and arranged as to cause the turbulence in the cooling liquid to be low enough such that the residual polymer particles float upwards in the tank. The cooling liquid that has passed through the separation device, referred to herein as "filtered cooling liquid", is then returned to the main body of the pelletizer cooling liquid, either directly or indirectly via one or more other devices.

The flotation tank may be of any suitable design. The skilled person will be able to design a suitable size and shape of flotation tank based upon a consideration of the flow velocity of the cooling liquid into and out of the tank, the size of the residual polymer particles to be separated, and their density, which will affect the speed at which they float upwards in the tank.

Optionally, the flotation tank has a generally circular cross-section in a horizontal plane and the surface outlet is located along the vertical central axis of the flotation tank. For example, the flotation tank may be a cylindrical tank arranged vertically with the surface outlet being located in the centre of the tank when viewed from above. Optionally, the diameter of the flotation tank is at least 2 m, preferably at least 4 m, and is optionally no greater than 10 m. Optionally, the height of the flotation tank is in the range of from 2 to 20 m, preferably from 3 to 10 m, optionally from 4 to 8 m.

The surface outlet may be any suitable shape and size as long as it is located at or near the surface of the cooling liquid in the tank. In a preferred embodiment, the surface outlet is located at the surface of the cooling liquid in the tank, but it is within the scope of an embodiment of the apparatus for the surface outlet to be below the surface but to draw cooling liquid from a region below the surface, for example, from the uppermost 20% or 10% of cooling liquid in the tank. The important point is that the cooling liquid entering the surface outlet should have an enhanced concentration of residual polymer particles by virtue of the flotation of residual polymer particles within the tank. Optionally, the surface outlet is a funnel having an upper edge in the form of a weir. The cooling liquid in the tank flows over the weir and into the funnel. The rate of flow of the cooling liquid over the weir may be controlled by controlling the level of the cooling liquid in the flotation tank relative to the location of the weir. For example, the average level of the cooling liquid in the tank may be in the range of from 1 to 150 mm, optionally from 5 to 100 mm, and further optionally from 10 to 50 mm above the level of the weir. The weir may be of any suitable shape, and may for example, be notched. Optionally, the weir is a circular weir having a horizontal straight edge. (The word "straight" in this context means "un-notched".)

The inlet into the flotation tank may be of any suitable shape but is preferably designed to minimize turbulence as the cooling liquid flows into the tank. Optionally, the inlet for the cooling liquid to flow into the flotation tank is tangentially arranged with respect to the flotation tank. In that way a circulating motion is generated in the cooling liquid, especially when the flotation tank has a circular cross-section in a horizontal plane, which induces the residual polymer particles to move toward the middle of the tank where they may be collected by a centrally located outlet.

Optionally, the inlet into the flotation tank is at approximately the same level as the surface outlet such that cooling liquid entering the flotation tank through the inlet will enter at the surface of the cooling liquid in the tank. In that way, residual polymer particles carried into the tank in the cooling liquid will already be in the region of the surface of the cooling liquid, so the residual polymer particles will not have to float as far as would be the case for an inlet located lower down in the tank. The tank may have more than one inlet for cooling liquid. Optionally, there is only a single inlet for cooling liquid into the tank.

Optionally, the inlet into the flotation tank is within the upper half of the tank and is preferably at approximately the same level as the surface outlet such that cooling liquid entering the flotation tank through the inlet will enter the uppermost 50% of the cooling liquid in the tank and preferably at the surface of the cooling liquid in the tank.

Optionally, the apparatus further comprises a calming drum arranged upstream of the flotation tank for reducing the velocity of the cooling liquid before it enters the flotation tank, in which the calming drum has an inlet for receiving cooling liquid, for example, from the drying apparatus, and an outlet which communicates with the inlet of the flotation tank. The function of the calming drum is to reduce the turbulence of the cooling liquid before it enters the flotation tank. The calming drum is optionally a cylindrical vessel, preferably vertically arranged.

Optionally, the inlet to the calming drum and the outlet from the calming drum are vertically spaced apart with the outlet being the uppermost.

Optionally, the outlet from the calming drum is higher, for example at least 1 m higher, than the inlet to the calming drum.

The separation device may be any device suitable for separating the residual polymer particles from the cooling liquid. Optionally, the separation device includes a screen. The screen will have a mesh size which is suitable for capturing the desired size of residual polymer particles. For example, the screen may have a mesh size of less than 300 microns. Optionally, the screen is mounted at an angle to a horizontal plane, so that captured polymer particles flow downwards across the screen into a gutter arranged at the lowest edge of the screen.

Preferably, the flotation tank has at least one further outlet located under the surface of the cooling liquid in the tank, through which the cooling liquid can be returned to the pelletizer without passing through the separation device. In that way, the separation device may be sized to cope with only a fraction, for example, less than 50%, optionally less than 20%, of the flow of cooling liquid from the pelletizer, thereby achieving a cost saving and avoiding the need for large screens. Optionally, the flotation tank has a further outlet which is arranged in the lower half of the tank and which communicates with the pelletizer for return of the cooling liquid to the pelletizer. By locating the further outlet in the lower half of the flotation tank, the cooling liquid passing through that further outlet will have a relatively low concentration of residual polymer particles. Optionally, each further outlet is shielded by a baffle. The baffle helps to prevent turbulence in the tank caused by the outflow of cooling liquid through the further outlet, and also helps to avoid "funneling" of cooling liquid from the surface of the tank. Optionally, cooling liquid flowing through the separation device is returned to the calming drum, and returns to the pelletizer via the flotation tank.

Optionally, the velocity of the cooling liquid entering the flotation tank is no more than 1 meter per second, preferably no more than 0.75 m/s, preferably no more than 0.5 m/s.

The speed at which a residual polymer particle will float to the surface of the tank will generally vary inversely with the size of the particle. Below a certain minimum size, the particle may be inhibited from floating upwards by turbulence in the tank. Optionally, the turbulence of cooling liquid within the flotation tank is such as to allow residual polymer particles having a diameter of as small as 300 microns, preferably 100 microns, more preferably 50 microns to float to the surface of the cooling liquid in the flotation tank. Those skilled in the art will recognize that even though it may be desirable to employ a pellet cooling liquid tank designed for the least turbulence with the goal of maximizing the efficiency of removal of polymer particles, the size and therefore the cost may become uneconomical.

The apparatus and method of the fourth and fifth aspects are of general application to any underwater pelletizer. The pelletizer may be a pelletizer in a polymer manufacturing plant, for example, a plant for the continuous solution polymerization of olefin monomers. Alternatively, the pelletizer may be part of a polymer processing plant. The polymer pellets produced by the pelletizer will typically be carried by the flow of cooling liquid to a drying device, for example, a spin dryer, where the pellets are separated from the cooling liquid. The apparatus according to the fourth aspect will typically be located in the return loop for the return of cooling liquid from the drying device to the pelletizer and references to "cooling liquid from the pelletizer" should be understood to include cooling liquid from the drying device. In the case where a particulate pelletization aid is added to the cooling liquid, it is important that the pelletization aid is small enough to pass through the separating device for separating residual polymer particles from the cooling liquid.

In a sixth aspect, provided is a pelletizer and drying apparatus for the production of polymer pellets comprising: a pelletizer for injecting a polymer into a chamber containing cooling liquid thereby forming pellets, a drying apparatus to separate the pellets from the cooling liquid and dry them, and a conduit for carrying cooling liquid and pellets from the pelletizer chamber to the drying apparatus wherein the conduit has a length of at least 50 meters between the pelletizer chamber and the drying apparatus.

In a seventh aspect, provided is a polymerization plant comprising: a reactor for polymerizing one or more monomers to form a polymer-containing polymerization reaction mixture, a separation system for the separation of volatile components from the polymer-containing reaction mixture to give a polymer, a pelletizer for injecting the polymer into cooling liquid in a chamber, thereby forming pellets, a drying apparatus to separate the pellets from the cooling liquid and dry them, and a conduit for carrying the cooling liquid and pellets from the pelletizer chamber to the drying apparatus wherein the conduit has a length of at least 50 m between the pelletizer chamber and the drying apparatus.

In an eighth aspect, provided is a process of manufacturing or processing a polymer which comprises the steps of: injecting the polymer through a pelletizer into cooling liquid in a chamber, thereby forming polymer pellets, and passing the pellets and the cooling liquid from the chamber through a conduit having a length of at least 50 meters to a drying apparatus for separating the pellets from the cooling liquid and drying them.

Optionally, the polymer injected into the chamber containing cooling liquid will be in molten form, for example, it may be at a temperature of at least 100° C. greater than the temperature of the cooling liquid.

In many conventional pelletization systems the conduits between the pelletizer and the dryer are kept short, so that the pellets are still warm when they enter the dryer, so as to help the drying process and improve energy efficiency. The inventors have found that some polymers have an inherently low degree of crystallization and/or are slow to crystallize from the molten state during pelletization, and when in a state of incomplete crystallization are prone to agglomeration and/or deformation during the downstream finishing and packaging operations. The apparatus, plant and method of the sixth, seventh and eighth aspects help to promote the crystallization of the polymer pellets by giving them a relatively long residence time in the pelletizer cooling liquid. The inventors have found that it is especially important to provide long residence times for polymers have an inherently low to very low crystallinity. The apparatus, plant and method of the sixth, seventh and eighth aspects are of general application in any situation where a slowly crystallizing polymer is subject to pelletization. Optionally, the polymer is a polyolefin, especially a polyolefin made by the continuous solution polymerization of one or more olefin monomers.

Optionally, the conduit has a length of at least 100 meters, optionally at least 150 meters, preferably at least 200 meters, preferably at least 300 meters.

In one embodiment the conduit rises over its length such that the end of the conduit at the drying apparatus is elevated with respect to the end of the conduit at the pelletizer. Optionally, the conduit is free of any section which descends in the direction from the pelletizer to the drying apparatus. In that embodiment, the pellet cooling liquid conduit can be filled without giving rise to air locks and may be drained more easily than horizontal conduits. It is desirable, however, to keep the cooling liquid pressure at the pelletizer below the limit at which leaks would form between the pelletizer and the chamber walls and further to prevent unsafe over pressurization or rupture of the pelletizer chamber. Optionally, the head of cooling liquid between the pelletizer chamber and the drying apparatus is such that the pressure of the cooling liquid in the pelletizer chamber is less than 10 bar, preferably less than 6 bar, preferably less than 4 bar.

Following the decantation of the polymer pellets at the drying apparatus, which may comprise a glob catcher and spin dryer, the cooling liquid is preferably recycled back to the pelletizer. Optionally, the apparatus comprises conduits for recycling the cooling liquid from the drying means back to the pelletizer, optionally via one or more cooling liquid treatment devices. For example, the recycle system may include an apparatus for separating residual polymer particles according to the fourth aspect. Optionally the apparatus comprises one or more refrigerated heat exchangers for cooling the cooling liquid.

In one embodiment, the process is a process of manufacturing a polymer comprising the steps of: combining one or more olefin monomers, a solvent and a catalyst in a reactor to form a polymer-containing polymerization reaction mixture; separating the volatile components from the polymer-containing polymerization reaction mixture, downstream of the reactor, to provide polymer suitable for pelletizing; pelletizing the polymer by injecting the polymer into cooling liquid to form pellets; and separating the pellets from the cooling liquid, wherein the residence time of the pellets in the cooling liquid is at least 10 seconds.

Optionally, the residence time of the pellets in the cooling liquid is at least 20 seconds, optionally at least 50 seconds, preferably at least 100 seconds and in some cases at least 150 seconds. The residence time of the pellets in the cooling liquid is optionally less than 300 seconds.

In one embodiment, the pellets are of a polymer having a Shore A hardness of no more than 60, optionally no more than 50 immediately after they are separated from the cooling liquid. Optionally, the polymer pellets have a Vicat A (ASTM D 1525) softening point of no more than 60° C., optionally no more than 50° C. immediately after they are separated from the cooling liquid.

Optionally, the cooling liquid is chilled to a temperature in the range of from 0° C. to 40° C., optionally 5° C. to 15° C., for example, from 5° C. to 10° C.

In a ninth aspect, provided is a dryer apparatus for drying polymer pellets comprising: one or more conveyors to convey the pellets through a first drying zone for drying the pellets and then through a second drying zone for cooling the pellets arranged downstream of the first drying zone, conditioning means to produce conditioned air, a blower for blowing the conditioned air into the second drying zone to cool the pellets, a conduit for carrying the conditioned air from the second drying zone to the first drying zone, and a heater for heating the conditioned air passing through the conduit such that, in use, the temperature of the air in the first drying zone is higher than the temperature of the air in the second drying zone.

Preferably, the dryer apparatus is a fluid bed dryer, the one or more conveyors is or are vibrating conveyors and the first and second drying zones are first and second fluid bed drying zones.

In a tenth aspect, provided is a method of drying polymer pellets comprising the steps of: passing the polymer pellets, preferably as a fluid bed, through a first drying zone and then through a second drying zone, conditioning atmospheric air to reduce its humidity and to bring it to a first temperature, passing the conditioned air through the second drying zone to cool the polymer pellets passing through the second drying zone, heating the conditioned air after it has left the second drying zone to produce conditioned air at a second temperature which is higher than the first temperature, and passing the conditioned air at the second temperature into the first drying zone to dry the polymer pellets passing through the first drying zone.

Fluid bed dryers are well known for use in drying polymer pellets. Conventional fluid bed dryers have vibrating conveyors and a single drying zone which is supplied with hot air for drying the pellets. However, even when the surface liquid has been dried from the pellets, the interior of the pellets may still be relatively cold compared to the ambient temperature so that when the pellets leave the dryer, moisture from the atmosphere condenses on the pellets, leading to wet pellets and/or clumping and agglomeration of the pellets on storage. This problem is particularly of concern in locations having hot and/or humid climates.

In the apparatus and method described herein, the dryer has two drying zones—a first one which is fed with heated air and in which most of the drying takes place, and a second zone in which the air has been dehumidified and slightly warmed such that its temperature is close to the ambient temperature, and allows the polymer pellets to attain a temperature close to ambient without excessive overheating, so that moisture from the air does not condense on the pellet. The air supplied to the second zone should not be so hot as cause the pellets to loose their crystallinity or start to soften. The air is dehumidified before entering the dryer, and is then passed in countercurrent fashion from the second to the first drying zone.

The second drying zone is located downstream, preferably immediately downstream, of the first drying zone.

In one embodiment, the apparatus is part of a polymerization plant and is for drying polymer pellets produced by a pelletizer in the polymerization plant.

Optionally, the apparatus comprises a first housing enclosing the first drying zone and a second housing enclosing the second drying zone. Preferably, the dryer is a fluid bed dryer.

Any suitable air conditioning apparatus can be used as the air conditioning means. Optionally, the air conditioning means comprises a refrigerated heat exchanger to cool the air, means to remove cooling liquid condensed from the cooled air and a heater to heat the air. In that way, the air conditioning means can supply to the second drying zone air which has been dehumidified and partially reheated so that it has the capacity to take up any moisture remaining on the pellets as they pass through the second zone. Optionally, the refrigerated heat exchanger is cooled by cooling liquid from an underwater pelletizer. Optionally, the apparatus comprises a first vibrating conveyor to convey the pellets through the first drying zone and a second vibrating conveyor for conveying the pellets through the second drying zone. The stroke angles of the respective vibrating conveyors can then be individually altered so as to adjust separately the residence time of the pellets in each zone. Optionally, the vibrating conveyor or conveyors is or are perforated, that is, the vibrating beds are perforated, thereby allowing the drying air to circulate between the pellets more effectively.

Optionally, the temperature of the air in the first drying zone is in the range of from 30° C. to 100° C., advantageously from 40° C. to 80° C., preferably from 45° C. to 70° C., more preferably from 50° C. to 60° C. Optionally, the temperature of the air in the second drying zone is in the region of from 20° C. to 50° C., preferably from 20° C. to 35° C.

In an eleventh aspect is provided a drying apparatus for drying polymer pellets comprising a conveyor to convey the pellets through a drying zone, air conditioning apparatus to produce dehumidified air and a blower for blowing the dehumidified air into the drying zone to dry the pellets.

As explained above with reference to the ninth and tenth aspects, the use of dehumidified air in the dryer allows the polymer pellets to be bought to ambient temperature while still providing a drying action thereby avoiding condensation of moisture of the pellets upon leaving the dryer. Optionally, the drying apparatus is a fluid bed drying apparatus. Optionally, the conveyor is a vibrating conveyor. Optionally, the apparatus has a first drying zone and a second drying zone and the apparatus further comprises a first conduit for carrying dehumidified air from the air conditioning apparatus into the first drying zone, a second conduit for carrying the dehumidified air to the second drying zone, and a heater for heating the dehumidified air as it passes through the second conduit.

Optionally, the drying apparatus is a fluid bed drying apparatus.

The apparatus of the ninth and eleventh aspects is particularly applicable to the drying of pellets of polymers which are soft, for example, pellets of a polymer having a Shore A hardness of no more than 60, optionally, no more than 50, or a Vicat A Softening Point (ASTM D 1525) of no more than 60° C., optionally no more than 50° C. as they pass through the dryer apparatus. The polymer may be a polyolefin such as a polyolefin made by a continuous solution polymerization process.

The preferred and optional features of the ninth and tenth aspects also apply to the apparatus of the eleventh aspect.

In a twelfth aspect, provided is a plant comprising: a pelletizer for forming a polymer into pellets, a dusting apparatus for applying a coating dust to the pellets, and a pneumatic conveyor for carrying the dusted pellets to a packaging apparatus, the pneumatic conveyor being provided with a cooling device for cooling the conveying air, the pneumatic conveyor also having an air lock for admitting the dusted pellets and an outlet for releasing the dusted pellets to the packaging apparatus.

In a thirteenth aspect, provided is a method of conveying polymer pellets in a polymerization plant or a polymer processing plant from a dusting apparatus for dusting the pellets with a coating dust to a packaging apparatus, which comprises: introducing the dusted pellets into a pneumatic conveyor having an air lock for admitting the dusted pellets from the dusting apparatus, an outlet for releasing the dusted pellets to a packaging line, and which is provided with a cooling device for cooling the conveying air, conveying the dusted pellets through the pneumatic conveyor, and releasing the dusted pellets through the outlet to the packaging apparatus.

A coating dust is often applied to newly-formed polymer pellets to stop them from sticking to equipment or agglomerating in the transport and packaging machinery and during storage. However, the dust causes a health hazard to workers in the vicinity of the transport and packaging apparatus because it tends to spread in the atmosphere in areas where the pellets are handled or moved.

The inventors have mitigated that problem by providing a plant and process where the pellets are transported to a packaging station through an enclosed pneumatic conveyor. However, in a pneumatic conveyor, the energy imparted by the blower to the conveying air tends to result in a significant warming of that conveying air, which can sometimes reach temperatures as high as 100° C. The plant and method of the twelfth and thirteenth aspects utilizes a cooling device to cool the conveying air, thereby allowing it to convey the soft polymers without sticking or agglomeration of the pellets in the conveyor.

Pneumatic conveyors are well known. They typically comprise a system of conduits and a blower for blowing air through the conduits.

The cooling device may be any suitable device for cooling the conveying air. Optionally, the cooling device is a heat exchanger. In one embodiment, the heat exchanger is cooled by cooling liquid from the pelletizer. Optionally, the cooling device comprises a dehumidifier apparatus such as a cooling liquid knock-out drum for removing cooling liquid which condenses as the conveying air is cooled. Optionally, the plant comprises a heater located downstream of the cooler for reheating the cooled air. Optionally, the heater reheats the air to a temperature which is in the range of from 10° C. to 40° C., preferably in the range of from 20° C. to 30° C., for example, to around ambient temperature, so that the pellets remain at ambient temperature and do not suffer from condensation of atmospheric moisture following their release from the pneumatic conveyor.

Preferably, the air lock for admitting the dusted pellets into the conveyor is a rotary air lock. Optionally, the air lock has a tip velocity no greater than 1 meter per second, in order to minimize the risk of sparks which may cause a dust explosion.

Optionally, the pneumatic conveyor has a capacity in the range of from 5 to 40, for example, for 15 to 30 tonnes per hour of polymer pellets. Optionally, the pneumatic conveyor has a length no greater than 100 meters. Optionally, the pneumatic conveyor has a length of more than 10 meters, for example, more than 20 meters. At the end of the conveyor the dusty air may be vented to the atmosphere through a stack or roof vent, or the dusty air can be recycled back to the start of the conveyor. Optionally, the plant comprises a downstream dust separation device for separating coating dust from the conveying air. Optionally, the dust separation device is a bag filter located at the outlet from the conveyor. Optionally, the dust separation means further comprises an array of impulse jets arranged to fire jets of air at the bag filter in order to dislodge accumulated dust from the bag filter.

Optionally, the packaging apparatus comprises a silo arranged to hold the pellets prior to packaging, the silo having an outlet which communicates with a packaging device and an inlet which communicates with the outlet of the pneumatic conveyor. Optionally, the silo is a blender silo.

The plant may be any plant in which polymer pellets are formed and packaged. Optionally, the plant is a polymer processing or manufacturing plant. Optionally, the plant is a polymerization plant which comprises upstream of the pelletizer a reactor for the polymerization of one or more olefin monomers to form a polymer. In a preferred embodiment, the polymerization plant is suitable for the continuous solution polymerization of one or more olefin monomers in a hydrocarbon solvent and comprises a separation system for the separation of the hydrocarbon solvent and unreacted monomer from the polymer to form a polymer suitable for pelletizing, and the pelletizer is an underwater pelletizer adapted to inject the polymer into cooling liquid to form pellets and the plant further comprises a drying apparatus to separate the pellets from the cooling liquid and dry them.

Optionally, the method also includes the step of separating coating dust from the conveying air, for example, by passing it through a bag filter located downstream of the point at which the dusted pellets are released though the outlet. Optionally, the coating dust is a low density polyethylene powder or LDPE dust. Optionally, the dusted pellets comprise no more than 1.0 wt %, preferably no more than 0.5 wt %, preferably no more than 0.3 wt % of the coating dust. Optionally, the dusted pellets comprise at least 0.1 wt % of dust. Optionally, the pellets are of a polymer having a Shore A hardness of no more than 60, for example, no more than 50. Optionally, the cooling device for cooling the conveying air cools the conveying air to a temperature in the range of from −5° C. to 30° C., preferably from 0° C. to 20° C., condensed cooling liquid is removed from the cooled conveying air and the cooled conveying air is then heated again to a temperature in the range of from 10° C. to 40° C., preferably from 20° C. to 30° C. before contacting the pellets. Optionally, the velocity of the conveying air as it entrains the dusted pellets in the region of the air lock is no more than 30 meters per second, preferably no more than 25 meters per second.

In a fourteenth aspect, provided is a pelletizing and packaging apparatus comprising: a pelletizer for injecting a polymer into cooling liquid thereby forming polymer pellets, a drying apparatus to separate the pellets from the cooling liquid and dry them, a blender silo arranged to receive the pellets and being provided with re-circulation means to re-circulate the pellets in the silo, and a packaging device for packaging the pellets.

The packaging and pelletizing apparatus may be part of a finishing line in a polymer processing or manufacturing plant.

In a fifteenth aspect, provided is a polymerization plant comprising the pelletizing and packaging apparatus of the fourteenth aspect.

In a sixteenth aspect, provided is a method of pelletizing and packaging polymer pellets comprising the steps of: forming the polymer into pellets, conveying the pellets to a silo provided with re-circulation means to re-circulate the pellets, the residence time of the pellets in the blender silo being at least 5 minutes, and transferring the pellets from the silo to a packaging apparatus and packaging the pellets.

Conventionally, dried pellets are delivered direct to the packaging device in order to minimize process time. However, in the apparatus, the plant and method of the fourteenth, fifteenth and sixteenth aspects a silo is provided between the drying apparatus and the packaging device in which the pellets are held for a period of time before packaging. That delay provides further time for the pellets to crystallize before being packaged, thereby reducing the likelihood that the pellets will stick together and agglomerate following packaging. Moreover, because the silo is provided with means to re-circulate the pellets, the pellets in the silo are not held stationary in contact with their neighboring pellets for any substantial period, and so the likelihood of bridging and agglomeration of the pellets in the silo is minimized. Thus, during their residence time in the silo, the pellets are being constantly re-circulated from the bottom to the top of the silo, which also helps to continuously blend the pellets and to mix the pellets with any coating dust which has previously been added to the pellets.

Optionally, the apparatus includes a dusting apparatus arranged downstream of the drying apparatus and upstream of the silo for applying a coating dust to the pellets. Preferably, after the pellets are dried, they are dusted with a coating dust.

Preferably, the silo is a blender silo. A blender silo is a silo which is arranged to output a blend of pellets taken from different levels in the silo, rather than simply taking the bottommost pellets. In one embodiment, the blender silo includes a centrally-arranged vertical perforated blender tube. Pellets at different levels within the silo fall through the perforations into the blender tube which communicates with an outlet from the silo, so that the pellets flowing out of the silo are drawn from different levels within the silo.

The packaging apparatus is located downstream of the silo. Preferably, the silo has an outlet which communicates via a conduit with the packaging device.

Preferably, the conduit is provided with a valve for controlling the flow of polymer pellets from the silo to the packaging apparatus. In one embodiment, the silo is provided at its lower extremity with an outlet which communicates with a first conduit and a second conduit, the outlet being provided with a diverter valve for diverting polymer pellets exiting the silo from the first conduit to the second conduit and vice versa, the first conduit being in communication with the re-circulation means and the second conduit leading to the packaging device.

The packaging device may be any packaging device which is suitable for packing the pellets into bags, sacks, bulk bags, or other shipping containers for transport or storage. Optionally, the packaging device is a device for filling containers or sacks having a volume of at least 0.5 m$^3$, for example, bulk bags.

In one embodiment, the polymerization plant further comprises a reactor or reactors arranged in series or in parallel for the polymerization of one or more olefins to form a polymer-containing polymerization reaction mixture, and a separation apparatus for the separation of volatile components from the polymer-containing polymerization reaction mixture to give a polymer for pelletizing. The separation apparatus, which may include a liquid phase separator, a flash tank and/or a vacuum devolatilizer, communicates with the pelletizing and packaging apparatus so that polymer flows from the separation apparatus to the pelletizing and packaging apparatus.

Optionally, the reactor or reactors and the separation apparatus is suitable for the continuous solution polymerization of a feed comprising one or more olefin monomers and a hydrocarbon solvent.

Optionally, the residence time of the pellets in the silo is in the range of from 2 minutes to 200 minutes, preferably in the range of from 5 to 100 minutes, more preferably in the range of from 10 to 90 minutes, for example 10 to 50 minutes. In one embodiment, the polymer pellets are relatively soft. Optionally, the polymer pellets have, immediately before entering the blender silo, a Shore A hardness of no more than 60, for example, no more than 50. Optionally, the polymer pellets have, immediately before entering the blender silo, a Vicat Softening point of no more than 60° C., for example, no more than 50° C. Preferably, the polymer is a crystallizable polymer and the pellets crystallize at least partially whilst in the silo, that is, the level of crystallinity of the pellets (as measured in any suitable way such as DSC), may increase by, for example, at least 1%, optionally at least 3%, while the pellets are in the silo. Optionally, the ratio of the level of crystallinity of the pellets leaving the blender silo to the level of crystallinity of the pellets entering the blender silo is at least 1.1.

The silo may include any suitable device for re-circulating the pellets. Optionally, the silo is provided with a pneumatic re-circulation conveyor for re-circulating polymer pellets from the bottom of the silo back to an upper part of the silo.

Optionally, when polymer is not leaving the silo to be packaged it is diverted to the re-circulation means for re-circulating to the upper part of the silo such that the pellets within the silo are continuously moving. In that way, the prospect of the pellets bonding to each other to form agglomeration is reduced.

Optionally, the capacity of the re-circulation means is in the range from 5 to 50, for example, from 10 to 30 tons of pellets per hour.

In one embodiment the flow rate of polymer pellets from the pelletizer and the internal volume of the silo are such that the residence time of the pellets in the silo is in the range of from 5 to 100 minutes, optionally from 10 to 90 minutes, optionally from 10 to 50 minutes, optionally from 15 to 30 minutes, when the silo is from 10 to 50%, preferably from 20 to 40% full, under steady state conditions in which the flow of pellets into the silo from the drying apparatus equals the flow of pellets out of the silo to the packaging apparatus. In that way, the silo has considerable space as a surge capacity in the event of a temporary stoppage of the packaging apparatus.

In a seventeenth aspect, provided is an apparatus for packaging polymer pellets into containers or sacks, the apparatus comprising: a silo having an inlet for receiving polymer pellets and at its lower extremity an outlet for releasing polymer pellets which is provided with a diverter valve mechanism which allows a flow of polymer pellets out of the silo to be switchable between:

a) a re-circulation loop to re-circulate polymer pellets to an upper part of the silo;
b) a conduit leading to a first packaging station; and
c) a conduit leading to a second packaging station.

In a conventional pelletizing and packaging line, the pellets typically flow from the pelletizer dryer to the packaging station through a single conduit having a single outlet at the packaging station. In contrast, the embodiments described herein provide an apparatus which allows the flow of pellets to be switched between a first packaging station, a second packaging station and a re-circulation loop. The diverter valve mechanism at the outlet allows one container or bag to be filled at one station while another container or bag is put in place at another station, thereby saving time. The provision of the re-circulation loop means that all or a portion of the flow from the silo can be diverted back to the upper part of the silo, thereby maintaining a high flow rate through the outlet even if the container bag filling is interrupted.

In one embodiment, the silo is a silo as described above in relation to the fourteenth to fifteenth aspects.

Optionally, the silo is a blender silo having a perforated vertical tube arranged in a central region of the silo.

In one embodiment, the outlet from the silo communicates with a first conduit and a second conduit wherein the first conduit communicates with the re-circulation loop for re-circulating polymer pellets to the upper part of the silo and the second conduit communicates with third and fourth conduits, the third conduit leading to the first packaging station and the fourth conduit leading to the second packaging station, and in which there is provided a first diverter valve for switching flow of polymer pellets through the outlet of the silo from the first conduit to the second conduit and vice versa and a second diverter valve for switching flow of polymer pellets through the second conduit from the third conduit to the fourth conduit and vice versa. In that embodiment, the first diverter valve controls whether the flow of polymer pellets goes to the re-circulation loop or to the packaging apparatus, and the second diverter valve determines which of the two packaging stations the pellets go to.

Preferably, the outlet from the silo and the first and second conduits form an inverted 'Y' shape with the angle between the first and second conduits being no more than 80°, and in which the second conduit has a vertical portion which forms with the third and fourth conduits an inverted 'Y' shape in which the angle between the third and fourth conduits is no greater than 80°. Optionally, the angle between the first and second conduits is in the range of from 50 to 70°, and is preferably about 60°. Optionally, the angle between the third and fourth conduits is in the range of from 50 to 70°, and is preferably about 60°. Optionally, each of the first, second, third and fourth conduits is at an angle in the range of from 20 to 40°, preferably from 25 to 35°, to the vertical. In conventional diverter valve arrangements, the angle between the two outlet conduits is typically 90° or greater. However, the inventors have found that a diverter valve having an angle lower than 90° reduces the likelihood of the polymer blocking the valves, especially when the polymer is a relatively soft polymer.

The apparatus may be arranged to fill any suitable type of container, sack or bag. Preferably, the apparatus is arranged to fill bags or sacks of large capacity, for example, having a volume of at least 0.5 m³, preferably at least 0.75 m³. Optionally, the first and second packaging stations are arranged to fill bulk sacks. Bulk sacks are also known as big bags or super sacks and are well known to the skilled person. Optionally, each packaging station is a form, fill, and seal bagging machine that is used to package the pellets into small bags to a gross weight of between 10 and 50 kg, and more preferably between 20 and 40 kg.

The terms "switchable" and "switching" used herein include the case when all the flow is diverted from one conduit to another and also includes the case where only a portion of the flow is diverted from one conduit to another. Preferably, the first diverter valve is continuously variable (rather than having only two positions) so that the flow of polymer pellets through the outlet can be split such that part of the flow goes to the recycle loop and the remaining part of the flow goes to either the first packaging station or the second packaging station. In that way, when a container or bulk sack is mostly filled, say 80% filled, the major proportion of the flow of polymer pellets can be diverted to the re-circulation loop, with only a minor proportion going to the packaging station, thereby allowing accurate filling the container or bulk sack.

Optionally, the first and second packaging stations are each provided with a metal detector for detection of metallic objects in the polymer particles.

In one embodiment, the silo contains polymer pellets which are of a polymer having a Shore A hardness of no more than 60, optionally no more than 50. Optionally, the silo contains pellets which have a Vicat softening point (ASTM D 1575) of no more than 60° C., optionally no more than 50° C.

The words "sacks" and "bags" are used interchangeably herein.

The aspects of the embodiments described above may be applied to a wide range of polymers. In a preferred embodiment, the polymer is a polyolefin (the term "polyolefin" includes a mixture of multiple polyolefins). The polymer is optionally a soft or tacky polymer, for example, a polymer having a Shore A hardness of less than 60, optionally, less than 50. Optionally, the polymer has a Vicat A softening point (ASTM D 1575) of no more than 60° C., optionally no more than 50° C. All references herein to Vicat softening point are as measured according to ASTM D 1575 Loading 1 (10N) and Rate B (120 C/h). The polymer may also be rubber, a plastomer, an ethylene-propylene-diene-monomer (EPDM) polymer, or a propylene/ethylene rubber.

Embodiments of the invention(s) are described below with reference to a polymerization plant for the solution polymerization of olefins. However, the individual aspects described above may be practiced in other processes and plants, and each aspect may be practiced in processes and plants not employing the feature of the other aspects. Furthermore, any aspect described above may be employed in conjunction with any of the other aspects.

Many aspects of the embodiments described above are of general applicability to a wide range of polymer manufacturing and processing apparatus. However, for the purposes of illustration, aspects of the invention(s) are described below in the context of a continuous solution polymerization apparatus and process, in which a feed of olefin monomers and solvent is continuously polymerized in one or more reactors, with the polymerization effluent being fed from the reactors to a finishing and packaging line where volatile components such as solvent and monomer are separated from the polymer and the polymer is converted into pellets and packed.

The apparatus will typically include a means to supply a feed of one or more olefin monomers in a hydrocarbon solvent, which, may be any suitable apparatus but will typically include a conduit for the supply of each of the monomers to a common feed conduit, a conduit for the supply of recycled solvent, a conduit for the supply of fresh solvent and a pump or pumps for pumping the feed to the reactor or reactors, and for pressurizing the feed to the desired pressure.

The reactor arrangement may be single reactor or a plurality, preferably two, reactors arranged in series, or preferably in parallel. The reactor or each reactor is optionally a continuous stirred tank reactor.

By raising the pressure, for example, to above 75 bar, the formation of two-phase conditions is avoided in the reactor arrangement and heating arrangement under a wide range of temperature and polymerization conditions. Hence a wide variety of catalysts can be used in the process. Such a wide range of catalysts can be used to make high and/or low average molecular weight materials under optimized production conditions. Use of a separate pump to boost the pressure of the viscous polymerization mixture between the reactor and the liquid phase separator can be avoided, [such pumps are much more costly than the low viscosity feed pump]. The pressure of the pump also cascades through the process and combines with the absence of vaporization for the initial solvent separating stage to reduce overall pumping needs during finishing. The pressure of the pump advances the viscous polymerization mixture to the pressure reducing means upstream of the liquid phase separator without allowing phase separation prior to the pressure reducing means. In a preferred form, the pressure of the pump additionally advances one or both separated phases to further downstream fractionating systems or purification devices such as high pressure flash separation devices or low pressure flash separating devices.

Preferably, a catalyst killer is added downstream of the reactor or reactors (in the case of series reactors that means that the killer is added downstream of the last polymerization reactor) and upstream of a heating arrangement and the liquid phase separator to suppress further polymerization of the heated polymerization mixture undergoing separation, the lean phase being passed through a cooling apparatus, which may comprise a heat integrating exchanger and a final cooler, and optionally a dryer back to the inlet side of the pump; the polymer-rich phase being subjected to additional solvent removal downstream to obtain a solid polymer.

The addition of the catalyst killer permits the temperature to be increased without risking further polymerization thereby facilitating direct recycle of separated solvent and monomer to the feed supply means on the inlet side of the pump, after removal of any surplus killer. With term "direct" is meant that the lean phase generally does not need to be fractionated.

Preferably, energy consumption per unit polymer produced is low, with simple solvent recovery and energy integration systems [such as heat integrating exchanger], which can be employed to minimize discharges to atmosphere and to recover heat from the effluent on the liquid phase separator.

Preferably, the liquid phase separator is connected to the flash tank, arranged downstream, which receives the polymer-rich phase from the liquid phase separator. Preferably, the flash tank operates at a pressure sufficient to allow feeding of the vapor phase to the fractionating and purification system without requiring a separate compressor, and said pressure is generally 2 bar gauge ("barg") or more. In order to accommodate production of polymers with a wide range of molecular weights, this pressure in the flash tank can be raised to a high level, between 3 and 20 barg, to adjust solution viscosity to facilitate feeding of the concentrated polymer solution to a final devolatizing stage. Thus the volatile phase removed from a concentrated phase is optionally conveyed simply to a fractionating tower as a vapor, arranged downstream of the flash tank, for purification. In some prior art arrangements where solvents, etc., are drawn off under a low pressure in the vapor phase, the extracted volatiles must be condensed and passed through pumping means for subsequent further separation steps.

In one embodiment the lean phase is passed in liquid form to a means for removing hydrogen added to or generated during polymerization, which means comprises a means for contacting a stripping vapor with the lean phase in a countercurrent flow arrangement to concentrate the hydrogen in the vapor phase for removal from the lean phase recycle.

Downstream of the liquid phase separator, the polymer-rich phase enters a flash tank operating at a pressure such that solvent and residual monomer vaporizes to leave a concentrated polymer phase. The vapor is separated as an overhead stream from the flash tank and the concentrated polymer phase typically is collected in the bottom of the flash tank from where it passes through an outlet into a conduit and eventually flows to a vacuum devolatilizer.

Optionally, the plant comprises more than one flash tank.

The plant preferably comprises a pump such as a gear pump for withdrawing the concentrated polymer phase from the flash tank (or if there is more than one flash tank from the most downstream of those flash tanks) and pumping it to the inlet of the devolatilizer.

The term 'vacuum devolatilizer' refers to a device in which the concentrated polymer phase is exposed to a vacuum whilst being agitated to expose new surface area, thereby causing further residual solvent and monomer to evaporate and be drawn off.

The level of volatiles (typically residual solvent and monomer), present in the concentrated polymer phase immediately downstream of the flash tank is optionally less than 30 wt %, preferably less than 20 wt %. The level of volatiles in the polymer immediately downstream of the devolatilizer is preferably no more than 0.5 wt %, preferably no more than 0.01 wt %.

The pressure in the vacuum devolatilizer is preferably no more than 500 mmHg, preferably no more than 100 mmHg, and further preferably no more than 30 mm Hg. The temperature is optionally in the range of from 150° C. to 300° C.

A stabilizer may be added to the polymer at some point in the finishing line to improve storage stability.

Preferably, the process uses a non-polar solvent which does not coordinate or interfere in a meaningful way so as to inhibit the catalytic action of the catalyst system. Preferably, the process uses a low boiling, alkane based solvent, optionally mixtures of alkanes, which may be linear or branched, such as those having from 4 to 10 carbon atoms, preferably in the range of 5-7 carbon atoms, optionally in admixture with other alkanes of a higher or lower molecular weight. The solvent is preferably a hexane, such as isohexane.

The polymer may be derived of monomers predominantly comprising mono-olefins such as ethylene or propylene or other higher alpha-olefins having from 4 to 10 carbon atoms. This combination provides a mixture which can be easily separated inside the liquid phase separator.

Considerable energy can be preserved by providing that the polymerization mixture from the reactor is heated to the temperature before reaching the separator successively by an upstream heat integration exchanger and a downstream trim heat exchanger and by providing that the lean phase from the separator is used to supply heat to the upstream one of said heat exchangers.

Working pressures in the reactor or reactors can be 75 bar or more, 80 bar or more, 90 bar or more; 95 bar or more and especially 120 bar or more, or even 140 bar or more. The upper pressure limit is not critically constrained but typically can be 200 bar or less, preferably 140 bar or less, or 120 bar or less. The pressure should suffice to keep the reactor solution in a single phase up to the point of the pressure reducing means, and to provide the necessary working pressure to convey the fluids through the plant.

The feed temperature may vary depending on the available exotherm and extent of monomer conversion desired to reach the polymerization temperature. Advantageously the temperature is no higher than 40° C., optionally no higher than 20° C., optionally no higher than 0° C., and is optionally lower than −20° C., or in the range from −20° C. to −40° C. The polymerization temperature is constrained by the molecular weight desired, allowing for the influence of any hydrogen added. In a series reactor process the temperature in the successive reactors can be raised progressively in increments depending on the nature of the polymerization taking place in such reactors. Advantageously, the polymerization temperature for polymers comprising predominantly ethylene derived units is at least 80° C., preferably at least 150° C. or even (for lower molecular weight materials) 200° C. or more. The temperature should not exceed the polymerization decomposition temperature or the temperature at which the catalyst can sustain the polymerization reaction.

Overall the exotherm may lead to a temperature differential between the inlet temp of the polymerization reactor and the outlet of from 50 to 220 or up to 250° C. For example, by feeding at minus 40° C. and allowing the exotherm to raise the temperature to 210° C., a highly efficient process may result for producing lower molecular weight polymers. For higher molecular weight polymers, the temperature rise may need to be constrained via warmer feed and/or lower reactor temperatures to avoid excessive viscosity in the reactor solution that would degrade reactor mixing performance, thereby leading to non-uniform polymers.

Monomer concentration depends on the target polymer type and molecular weight, the associated conversions of monomer to polymer and operating temperature. Advantageously, when continuous stirred tank reactors are used for the polymerization reaction, the monomer concentration should be 10% or more by weight of the volatile components in the polymerization reactors; especially 15% or more, and should preferably not exceed 80%, 70% or especially 60%. In general, higher monomer partial pressures are preferred to improve the liquid phase separation in the liquid phase separator. In one embodiment each reactor is a continuous stirred tank reactor.

Other types of reactors, such as batch reactors or plug flow reactors may be used to conduct the polymerization. When plug flow reactors are used additional monomer or monomers, and/or catalysts may be injected at various points along the reactor to obtain a desired sequence distribution of the various monomers along the polymer chain.

In its broadest form, the polymerization processes described herein can be performed with any suitable catalyst, for example, a Ziegler Natta catalyst or a SSC (single sited catalyst). Preferably, a SSC is used. These generally contain a transition metal of Groups 3 to 10 of the Periodic Table; and at least one ancillary ligand that remains bonded to the transition metal during polymerization. Preferably, the transition metal is used in a cationic state and stabilized by a cocatalyst or activator. Especially preferred are metallocenes of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The catalyst is preferably a bulky ligand transition metal catalyst. The "bulky ligand" contains a multiplicity of bonded atoms, preferably carbon atoms, forming a group, which may be cyclic with one or more optional hetero-atoms. The bulky ligand may be metallocene-type cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group 4, 5 or 6 transition metal of the Periodic Table of Elements. The transition metal atom is preferably a Group 4 atom.

For the purposes of this patent specification the term "metallocene" is herein defined to contain one or more cyclopentadienyl moiety in combination with a transition metal of the Periodic Table of Elements.

Metallocene catalysts can be used with a cocatalyst which may be alumoxane preferably methylalumoxane having an average degree of oligomerization of from 4 to 30 as determined by vapor pressure osmometry. Alumoxane may be modified to provide solubility in linear alkanes or be used in a slurry but is generally used from a toluene solution. Such solutions may include unreacted trialkyl aluminum and the alumoxane concentration is generally indicated as mol Al per liter, which figure includes any trialkyl aluminum which has not reacted to form an oligomer. The alumoxane, when used as cocatalyst, is generally used in molar excess, at a mol ratio of 50 or more, preferably 100 or more, and preferably 1000 or less, preferably 500 or less, relative to the transition metal.

The SSC should preferably be selected from among a broad range, of available SSC's, to suit the type of polymer being made and the process window associated therewith in such a way that the polymer is produced under the process conditions at an activity of at least 40,000 g polymer per gram SSC (such as a metallocene), preferably at least 60,000 or even in excess of 100,000 g polymer per g SSC. By enabling the different polymers to be produced in different operating windows with an optimized catalyst selection, the SSC and any ancillary catalyst components can be used in small quantities, with optionally also using small amounts of scavengers. The catalyst killer can be used in equally small amounts and the various cost-effective methods can then be introduced to allow the non-polar solvent to be recycled and subjected to treatment to remove polar contaminants before re-use in the polymerization reactor(s).

A metallocene may be also be used with a cocatalyst which is a non- or weakly coordinated anion (the term non-coordinating anion as used herein includes weakly coordinated anions. The coordination should be sufficiently weak in any event, as evidenced by the progress of polymerization, to permit the insertion of the unsaturated monomer component.) The non-coordinating anion may be supplied and reacted with the metallocene in any of the manners described in the art.

The precursor for the non-coordinating anion may be used with a metallocene supplied in a reduced valency state. The precursor may undergo a redox reaction. The precursor may be an ion pair of which the precursor cation is neutralized and/or eliminated in some manner. The precursor cation may be an ammonium salt as in EP-277003 and EP-277004, incorporated herein by reference. The precursor cation may be a triphenylcarbonium derivative.

The non-coordinating anion can be a halogenated, tetra-aryl-substituted Group 10-14 non-carbon element-based anion, especially those that are have fluorine groups substituted for hydrogen atoms on the aryl groups, or on alkyl substituents on those aryl groups.

The effective Group 10-14 element cocatalyst complexes are, in a preferable embodiment, derived from an ionic salt, comprising a 4-coordinate Group 10-14 element anionic complex, where $A^-$ can be represented as:

where M is one or more Group 10-14 metalloid or metal, preferably boron or aluminum, and each Q is a ligand effective for providing electronic or steric effects rendering $[(M') Q_1Q_2 \ldots Q_n]^-$ suitable as a non-coordinating anion as that is understood in the art, or a sufficient number of Q are such that $[(M')Q_1Q_2 \ldots Q_n]^-$ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, naphthyl and derivatives thereof The non-coordinating anion may be used in approximately equimolar amounts relative to the transition metal component, such as at least 0.25, preferably 0.5, and especially 0.8 and such as no more than 4, preferably 2 and especially 1.5.

Representative metallocene compounds can have the formula:

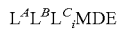

where, $L^A$ is a substituted cyclopentadienyl or hetero-cyclopentadienyl ancillary ligand π-bonded to M; $L^B$ is a member of the class of ancillary ligands defined for $L_A$, or is J, a hetero-atom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal; and, D and E are independently mono-anionic labile ligands, each having a σ-bond to M, optionally bridged to each other or $L^A$ or $L^B$. The mono-anionic ligands are displaceable by a suitable activator to permit insertion of a polymerizable monomer or macro-monomer that can insert for coordination polymerization on the vacant coordination site of the transition metal component.

Representative non-metallocene transition metal compounds usable as SSC's also include tetrabenzyl zirconium, tetra bis(trimethylsiylmethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris (trimethylsilylmethyl) tantalum dichloride.

Additional organometallic transition metal compounds suitable as olefin polymerization catalysts in accordance with process embodiments described herein will be any of those Group 3-10 that can be converted by ligand abstraction into a catalytically active cation and stabilized in that active electronic state by a non-coordinating or weakly coordinating anion sufficiently labile to be displaced by an olefinically unsaturated monomer such as ethylene.

More preferred are metallocenes which are biscyclopentadienyl derivatives of a Group IV transition metal, preferably zirconium or hafnium, for example, as disclosed in WO 99/41294, incorporated herein by reference. These may advantageously be derivatives containing a fluorenyl ligand and a cyclopentadienyl ligand connected by a single carbon and silicon atom, for example, as disclosed in WO 99/45040; and WO 99/45041, each of which incorporated herein by reference. More preferably the Cp ring is unsubstituted and/or the bridge contains alkyl substituents, suitably alkylsilyl substituents to assist in the alkane solubility of the metallocene, for example, as disclosed in WO 00/24792 and WO 00/24793, each of which is incorporated herein by reference. Other possible metallocenes include those in WO 01/58912, incorporated herein by reference.

Dow in EP 0418044, incorporated herein by reference, discloses a monocyclopentadienyl compound similar that of EP 0416815. Similar compounds are described in ExxonMobil EP 0420436 incorporated herein by reference. Sumitomo WO 97/03992, incorporated herein by reference, shows a catalyst in which a single Cp species and a phenol are linked by a C or Si linkage, such as $Me_2C(Cp)(3-tBu-5-Me-2-phenoxy)TiCl_2$. Nova WO 2001/05849 discloses Cp-phosphinimine catalysts, such as $(Cp)((tBu)_3P=N—)TiCl_2$, incorporated herein by reference.

Other suitable metallocenes may be bisfluorenyl derivatives or unbridged indenyl derivatives which may be substituted at one or more positions on the fused ring with moieties which have the effect of increasing the molecular weight and so indirectly permit polymerization at higher temperatures such as described in EP 0693506 and EP 0780395, each of which is incorporated herein by reference.

When using the catalysts described above, the total catalyst system will generally additionally comprise one or more organometallic compounds as scavenger. Such compounds as used in this application is meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The impurities, or catalyst poisons include water, oxygen, polar organic compounds, metal impurities, etc. Preferably, steps are taken to remove these poisons before introduction of such into the reaction vessel, for example, by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941, each of which is incorporated herein by reference. Exemplary compounds include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. The amount of such compounds to be used with catalyst compounds is minimized during polymerization reactions to that amount effective to enhance activity (and with that amount necessary for activation of the catalyst compounds If used in a dual role) since excess amounts may act as catalyst poisons.

The process and the plant used in the process are designed as explained above to permit polymerization of a wide variety of polymer types and molecular weights. Generally speaking the polymers are derived from either ethylene or propylene as the dominant (more than 50 mol %) polymerized component. Polymers may preferably contain from 5 to 50 mol % of comonomer to vary crystallinity and flexibility. The comonomers may be alpha-olefins (under which term cyclic olefins such as styrene are included) having from 2 to 20 carbon atoms, such as ethylene (in the case of the polymer consisting predominantly of propylene derived units) 1-butene, 1-hexene, 1-octene. Amounts of dienes such as hexadiene, vinyl norbornene, ethylidene norbornene (ENB), norbornadiene, etc., may be included to promote unsaturation and/or the formation of longer branches themselves made from polymerized monomer derived units.

In the case of plastomer, the polymer which may be produced include the following aspects: Preferably, the comonomer is an alpha-olefin having from 3 to 15 carbon atoms, more preferably 4 to 12 carbon atoms and more preferably 4 to 10 carbon atoms. Ethylene can be polymerized with at least two comonomers to form a terpolymer. Monomer is generally polymerized in a proportion of 70.0-99.99 mol %, preferably 70-90 mol % and more preferably 70-80 mol % of ethylene with 0.01-30 mol %, preferably 3-30 mol % and more preferably 5-20 mol % comonomer. For the purposes of this patent specification the molecular weight distribution of a polymer can be determined with a Waters Gel Permeation Chromatograph equipped with Ultra-styrogel 5 columns and a refractive index detector. The operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.10. The molecular weight distribution of the plastomers that can be produced by the processes herein are termed "narrow" that is to say an $M_w/M_n$ less than 3, preferably less than or equal to 2.5. The MI of the polymers are generally in the range of 0.01 dg/min to 200 dg/min, preferably 0.1 dg/min to 100 dg/min, more preferably 0.2 to 50 dg/min and more preferably less than 10 dg/min. Contemplated densities of the plastomers are in the range of 0.83 to 0.93 g/cm³, preferably 0.85 to 0.90 g/cm³, more preferably 0.85 to 0.89 g/cm³.

The processes described herein can be especially concerned with copolymerization reactions involving the polymerization of one or more of the monomers, for example alpha-olefin monomers of ethylene, propylene, 1-butene, 1-pentene, 1,4-methyl-1-pentene, 1-hexene, 1-octene, 1-decene and cyclic olefins such as styrene. Other monomers can include polar vinyl, dienes, norbornene, acetylene and aldehyde monomers.

In the case of elastomers, the polymer which may be produced include terpolymers of an ethylene-α-olefin-EODE (Ethylene-alpha-Olefin-Diene Elastomer) of high $M_w$ and between 0.3 wt % and 15 wt % diene content, preferably between 2.0 wt % and 10 wt % diene content. These polymers may be largely amorphous and have a low or zero heat of fusion. As used herein the term "EODE" encompasses elastomeric polymers comprised of ethylene, an a-olefin, and one or more non-conjugated diene monomers. The non-conjugated diene monomer can be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; bicyclo-1 5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are, 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 wt % up to 90 wt % ethylene, more preferably 30 wt % to 85 wt % ethylene, more preferably 35 wt % to 80 wt % ethylene. The alpha-olefin suitable for use in the preparation of elastomers with ethylene and dienes are preferably propylene, 1-butene, 1-pentene, 1-hexene, 1-octene and 1-dodecene. The alpha-olefin is generally incorporated into the EODE polymer at 10 wt % to 80 wt %, more preferably at 20 wt % to 65 wt %. The non-conjugated dienes are generally incorporated into the EODE at 0.5 to 20 to 35 wt %; more preferably at 1 wt % to 15 wt %, and more preferably at 2 wt % to 12 wt %. If desired, more than one diene may be incorporated simultaneously, for example HD and ENB, with total diene incorporation within the limits specified above.

The elastomers may also be devoid of a diene and be a copolymer of two monomer types. Such copolymers may be elastomers of high $M_w$, low crystallinity, and low ash. The copolymers may be ethylene-alpha-olefin copolymers (EPC) of high M. As used herein the term "EPC" means a copolymer of ethylene and an alpha-olefin, not necessarily propylene, which exhibits the properties of an elastomer. The alpha-olefins suitable for use in the preparation of elastomers with ethylene are preferably $C_3$-$C_{10}$ alpha-olefins. Illustrative non-limiting examples of such α-olefins are propylene, 1-butene, 1-pentene, 1-hexene, 1-octene and 1-dodecene. If desired, more than one alpha-olefin may be incorporated. The EPC elastomers may contain 20 wt % up to 90 wt % ethylene, more preferably 30 wt % to 85 wt % ethylene, and more preferably 35 wt % to 80 wt % ethylene.

In the case of polymers derived predominantly from propylene derived units, the polymers have the following features as a result of the presence of isotactic polypropylene sequences in the chain.

In one embodiment, a copolymer of propylene and at least one comonomer, the comonomer being ethylene or an alpha-olefin. Comonomers include ethylene and linear or branched $C_4$ to $C_{30}$ alpha-olefins, or combinations thereof. Preferred linear alpha-olefins include ethylene and $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene. The propylene copolymer is preferably a random copolymer, as the term is defined herein below.

The polypropylene copolymer has a crystallinity of from 2% to 65%. Within this range of crystallinity, alternative lower limits of crystallinity can be 5% or 10%, and alternative upper limits of crystallinity can be 50%, 45% or 40%.

The crystallinity of the polypropylene copolymer is derived from isotactic (or alternatively syndiotactic) polypropylene sequences in the copolymer. The amount of propylene can be from 65 wt % to 95 wt %. Within this range, alternative lower limits of propylene content can be 70 wt % or 80 wt %, and alternative upper limits of propylene content can be 92.5 wt %, 90 wt %, or 89 wt %.

The semi-crystalline polypropylene copolymer necessarily has a non-zero heat of fusion, due to the measurable crystallinity. The crystallinity can be calculated from the heat of fusion, using a preferred value of 189 J/g for 100% crystallinity and a linear relationship between heat of fusion and crystallinity; see, B. Wunderlich, *Macromolecular Physics*, vol. 3, Academic Press (1980), esp. Chapter 8.4.2, incorporated herein by reference.

The polypropylene copolymer preferably has a single broad melting transition. Typically, a sample of the polypropylene copolymer will show secondary melting peaks or shoulders adjacent to the principal peak, and this combination is considered together as single melting point, i.e., a single broad melting transition. The highest of these peaks is considered the melting point. The polypropylene copolymer preferably has a melting point of from 25° C. to 110° C. Within this range, alternative lower limits of the melting point can be 30° C. or 35° C., and alternative upper limits of the melting point can be 105° C. or 90° C.

The weight average molecular weight of the polypropylene copolymer can be from 10,000 to 5,000,000 g/mol, preferably 80,000 to 500,000. The MWD ($M_w/M_n$) is preferably above 2. The MWD may be less than 40, more preferably less than 5 and more preferably less than 3. In another embodiment, it is preferred that the polypropylene copolymer has a ML (1+4) @125° C. less than 100, more preferably less than 75, even more preferably less than 60, and still more preferably less than 30.

The polypropylene copolymer preferably is a random, crystallizable copolymer having a narrow compositional distribution. The intermolecular composition distribution of the polymer is determined by thermal fractionation in a solvent. A typical solvent is a saturated hydrocarbon such as hexane or heptane. The thermal fractionation procedure is described below. Typically, approximately 75 wt % and more preferably 85 wt % of the polymer is isolated as one or two adjacent, soluble fractions, with the balance of the polymer in immediately preceding or succeeding fractions. Each of these fractions has a composition (wt % ethylene content) with a difference of no greater than 20% (relative) and more preferably no greater than 10% (relative) from the average weight % ethylene content of the polypropylene copolymer. For purposes of the present disclosure, the polypropylene copolymer is considered to have a "narrow" compositional distribution if it meets the fractionation test outlined above.

The length and distribution of stereoregular propylene sequences in preferred polypropylene copolymers is consistent with substantially random statistical copolymerization. It is well known that sequence length and distribution are related to the copolymerization reactivity ratios. As used herein, the term "substantially random" means a copolymer for which the product of the reactivity ratios is generally 2 or less. In contrast, in stereoblock structures, the average length of PP sequences is greater than that of substantially random copolymers with a similar composition. Prior art polymers with stereoblock structure have a distribution of PP sequences consistent with these "blocky" structures rather than a random, substantially statistical distribution.

The reactivity ratios and sequence distribution of the polymer may be determined by C-13 NMR, which locates the ethylene residues in relation to the neighboring propylene residues. To produce a crystallizable copolymer with the required randomness and narrow composition distribution, it is desirable to use: (1) a single-sited catalyst; and (2) a well-mixed, continuous flow, stirred tank polymerization reactor which allows only a single polymerization environment for substantially all of the polymer chains of preferred polypropylene copolymers.

Preferred propylene-ethylene copolymers are described in U.S. Pat. No. 6,635,715, incorporated herein by reference.

As general guidance when the molecular weight of the polymers is too low, liquid phase separation in the manner described herein may be hindered or made inefficient as an excessive amount of polymer might then be carried over in the lean phase. The precise boundary depends on solvent composition and polymer composition as well as molecular weight. A rapid pressure let-down, generally greater than 20 bar/second, preferably 30 bar/second or more, more preferably 40 bar/second or more, even more preferably 50 bar/second or more, assists in inducing disengagement of the two phases. This rapid pressure decrease preferably starts from a pressure above the binodal boundary or LSCT and stops at a pressure below the spinodal boundary. The preferred phase separation is by spinodal decomposition and is called pressure induced phase separation (PIPS). Also the liquid phase separator should provide a sufficient residence time to permit the settlement of the lean and concentrated phase at the lower end of the separator.

Molecular weight control may be exercised through control of hydrogen levels, which may be supplementary to control of molecular weight by control of the polymerization temperature.

The lean phase may be passed in liquid form to a means for removing hydrogen added to or generated during polymerization, which means comprises a means for contacting a stripping vapor with the lean phase in a countercurrent flow arrangement to concentrate the hydrogen in the vapor phase for removal from the lean phase recycle.

The stripping vapor preferably consists of a volatile monomer such as ethylene. The means may include a stripping vessel to remove hydrogen from the recovered solvent stream for use as the polymerization feed. The stripping vapor advantageously has a low hydrogen content, preferably below 5 mppm. The stripping vapor may be selected to be more volatile than other monomer or solvent components, be substantially devoid of contaminants that are deleterious to the polymerization catalysts, be recoverable in the plant recovery system, and preferably be available at high enough supply pressure for introduction into the stripping vessel without the aid of separate additional compression.

This embodiment is especially applicable to plant lay-outs where reactors are arranged to operate in series and where the upstream reactor is operated under no or low hydrogen conditions to provide a higher molecular weight fraction and where hydrogen is added to a downstream reactor to provide a lower molecular weight fraction.

With reference to FIG. 1, a plant is arranged as follows.

Feed Supply and the Polymerization Reactors

A feed for polymerization is passed through conduit 2 by a centrifugal pump 3. The feed contains: A) isohexane as solvent, B) monomer, generally the predominant monomer is ethylene or propylene, and optionally C) comonomer which may be any copolymerizable alpha-olefin, and optionally D) a diene or other polyene or cyclic copolymerizable material. The feed is passed through a refrigerated heat exchanger (6) in which the feed is optionally chilled to a low temperature for subsequent adiabatic polymerization in the two continuous stirred tank reactors 8 which are operated in series or parallel (for simplicity, only one reactor is depicted in FIG. 1). Activator and metallocene catalyst may be premixed and added at 5 and/or 7 to one or both reactors 8. A scavenger, generally in the form of an alkyl aluminum such as tri-isobutyl aluminum or tri-n-octyl aluminum is added at 4 to minimize the impact of poisons in the feed and in the reactor on the catalyst activity.

To complement the molecular weight control provided by controlling the polymerization temperature, hydrogen may be added to one or both reactors through conduits (not shown).

The Finishing and Packing Line

The polymer-containing polymerization mixture, which emerges from the reactors 8 through a conduit 11, is first treated with a catalyst killer, preferably water or methanol, added at 10 in a molecular solution in isohexane solvent to terminate the polymerization reaction. A heat exchanger 12 is arranged as part of a heat integrating arrangement and heated by a lean phase emerging from an upper layer 20 in a liquid phase separator 14, and provides an initial increase in the temperature of the polymer solution in the conduit 11. A trim heat exchanger 16, operating by using steam, hot oil or other high temperature fluid, further increases the temperature to a level suitable for liquid phase separation. The solution then passes through a let down valve 18 where a pressure drop is created which causes the separation of the polymer solution and settlement into the lean phase 20 and a polymer-rich phase 22 below it.

It is important to note that no energy consuming pump is required to provide a pressure increase in the conduit 11 between the reactors 8 and the separator 14 as the polymer-containing polymerization mixture is propelled by the pressure from the pump 3.

Treatment of Lean Phase

The lean phase 20, after being cooled by the heat exchanger 12, aforementioned, is cooled further by a cooling device 24, passed through a surge tank 26 adapted for stripping out the hydrogen and then submitted to in-line chemical analysis at 43 to determine the concentration of monomer and comonomer in the solvent. This cooled lean phase 43 is combined with fresh feed of solvent and monomer 30 to provide the desired concentrations and then passed through a drier 32 which serves to remove any unreacted water or methanol used as the catalyst killer or present in the fresh feed supplied or any impurity in the recycled solvent and monomer as will be explained.

Figure 3:
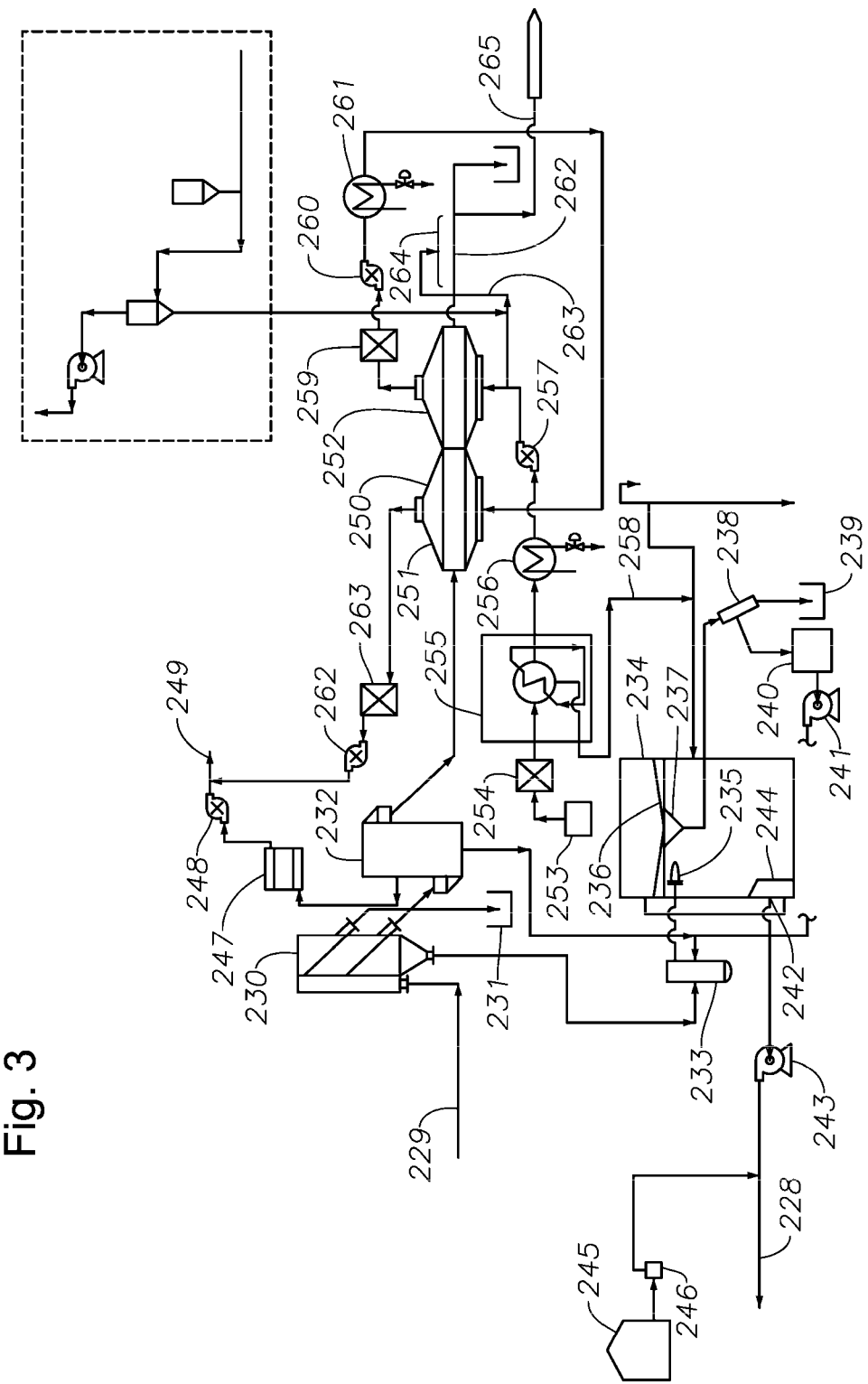
FIG. 3 shows schematically one embodiment of a drying apparatus including an apparatus for separating residual polymer particles from the pellet water according to one embodiment.

The surge tank 26 is arranged in the form a vessel 26 suitable for stripping out hydrogen by means of ethylene as a stripping vapor 25 as is shown in FIG. 3 of U.S. Pat. No. 6,881,800, incorporated herein by reference.

The vapor from vessel 26 is routed to the reflux drum 39 of tower 36. Partly it is processed to recover valuable components, principally volatile monomers such as ethylene and propylene, by fractionating tower 36 and its overhead vapor compression/condensation system for recycling through conduit 43 to the inlet side of the drier 32. The part mainly comprising hydrogen and any other non-condensables may be flared at 112.

A less preferred alternative is for part of the lean phase recycle to be flashed in a single stage flash vessel without the addition of stripping vapor. This, however, only permits limited hydrogen removal and detracts from the benefit of recycling the lean phase in its liquid state without energy intensive evaporation processes.

In arrangements using metallocene catalysts systems varying amounts of hydrogen may be produced by beta-hydride abstraction, even when no hydrogen is injected into the reactor. The amount may vary with metallocene selected. Its molecular weight reducing effect may be accommodated by appropriate selection of the reactor operating temperature. A substantial amount of this hydrogen may remain unreacted in the polymer-containing polymerization mixture stream 11. Reducing the amount of hydrogen recycled in this stream in the manner described above may be advantageous to permit adjustment of the molecular weight independent of the polymerization operating temperature by removal of the generated hydrogen or by addition of hydrogen from an external source, generally in the feed conduit 2.

In series reactor operation the ability to remove hydrogen can be exploited advantageously to widen the molecular weight split between the reactors and to broaden the molecular weight distribution beyond what would otherwise be possible. The feed supplied to the upstream reactor can have a hydrogen content below that which would prevail if hydrogen generated by beta hydride elimination remained in the recycle. Additional extraneous hydrogen can be added to the downstream reactor to provide a hydrogen content above that which would remain if hydrogen from beta hydride elimination were to remain in the recycle.

Treatment of Polymer-Rich Phase

The concentrated polymer-rich phase is passed to a low-pressure separator in the form of flash tank 34 where evaporated solvent and monomer are separated from the polymer-rich phase emerging from the liquid phase separator 14.

The evaporated solvent and monomer phase is passed through conduit 35 in a vapor phase to the purification tower 36 operating by distillation to separate a light fraction of the highly volatile solvent and unreacted ethylene and propylene on the one hand and heavier less volatile components such as hexane and any toluene used to dissolve catalyst or activator and unreacted diene type comonomers on the other hand. Use of toluene can be reduced under appropriate circumstances by a suitable selection of catalyst components and catalyst preparation conditions such as increases in catalyst solution temperature to increase the solubility of the catalyst components to reach a point where so little toluene is present that no separate process for the removal of the toluene are required. Alternatively, the catalyst may be dissolved in the same solvent type as that used for the polymerization. The solubility of the catalyst in solvents may be enhanced by raising the temperature at which the catalyst is dissolved and prepared.

Downstream of flash tank 34 the concentrated polymer phase is split into multiple streams, which are then passed to one or more substantially identical vacuum devolatilizers and packaging lines. For reasons of clarity, only one of those devolatilizers and finishing lines is referred to below and shown in the figures.

A gear pump 38 conveys the concentrated polymer phase from the flash tank 34 through a short conduit to each vacuum devolatilizing extruder or mixer 40.

A vacuum is applied through a port in the upper part of the devolatilizer chamber where again a vapor phase is drawn off for purification, condensed and then pumped to a purification tower 50. A heavy fraction of toluene used as catalyst solvent and diene such as ethylene norbornadiene (ENB) comonomer or 1-octene comonomer are recovered by this purification tower 50. The ENB or octene can be recycled through outlet 54. Alternative heavy comonomers, such as ENB and octene, may thereby be stored in separate storage vessels 55, 56, which facilitates rapid product transitions between different product families (e.g., EP(D)M and EB plastomers), while still enabling eventual recovery of the valuable unreacted comonomers.

At the end of the horizontal devolatilizer chamber the polymer flows into a screw extruder which drives the polymer along the barrel and into an underwater pelletizer, fed with water chilled at 42. Optionally, a gear pump may be used in series with the screw extruder to push the polymer through a screenpack and a die plate. The screenpack is useful in filtering out gels or other contaminants from the product. The screw extruder may be arranged at any angle to the devolatilizer, including linearly, and optionally at right angles to the devolatilizer. The polymer pellets are washed and spun dried at 44 to form pellets suitable for further dying and bagging or baling in a downstream location 46.

Figure 2:
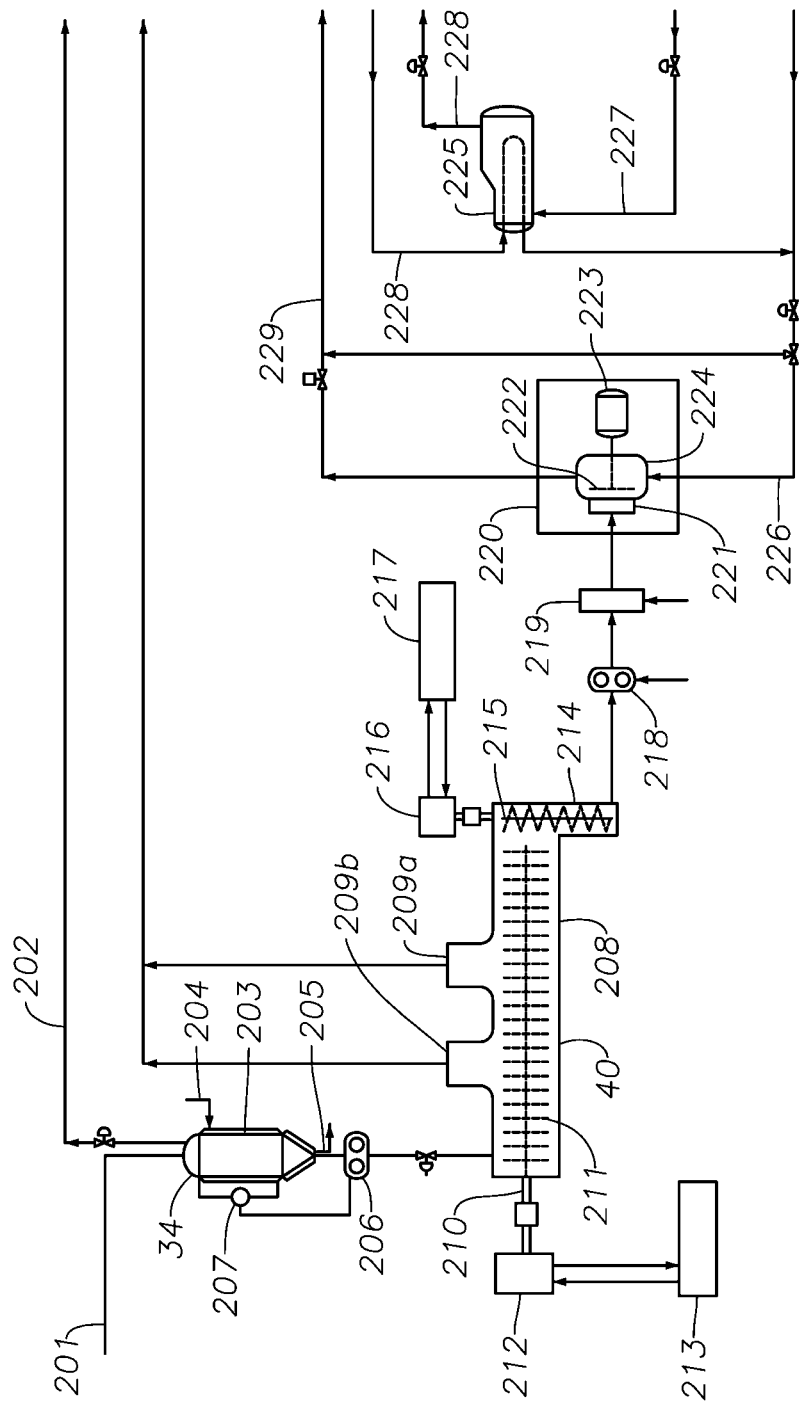
FIG. 2 shows schematically one embodiment of a devolatilizer and a pelletizer in an apparatus according to one embodiment.

FIG. 2 shows in more detail part of the finishing line immediately downstream of the liquid phase separator. The concentrated polymer phase from the liquid phase separator 20 enters the flash chamber 34 through line 201. Vapor is drawn off from flash tank 34 via overhead line 202 and carried to the solvent and monomer recycle system (not shown). Flash tank 34 is provided with heating jacket 203 which has an inlet connected to a supply of medium pressure stream at 204 and an outlet for removing condensate at 205. The concentrated polymer phase leaves the flash tank 34 via an outlet at its lowest extremity and passes through gear pump 206 before entering the chamber of vacuum devolatiliser 40. Flash tank 34 is also provided with a sensor system 207 for monitoring the level of the polymer in the flash tank and the speed of gear pump 206 is controlled in order to maintain that level within a predetermined range.

The vacuum devolatilizer 40 comprises a horizontally arranged cylindrical chamber 208 which has two large vacuum ports 209*a*, 209*b* which communicate with a vacuum system which maintains the pressure in chamber 208 at around 25 mmHg. A horizontal shaft 210 provided with a large number of paddles 211 rotates to agitate or knead the concentrated polymer phase inside the chamber 208. The shaft 210 is driven by hydraulic motor 212, which is powered by hydraulic drive 213.

At the end of the chamber 208 remote from the inlet, the polymer is forced along a horizontal shaft 214 (the shaft is shown as vertical in FIG. 2 for reasons of clarity) by screw 215 which is driven by a second hydraulic motor 216 provided with a second hydraulic drive 217. At the lower end of shaft 214 the polymer flows via a conduit into gear pump 218, through screen pack 219 and into underwater pelletizer 220. The pelletizer 220 comprises die plate 221, through which the polymer is extruded in threads which are chopped into pellets by a rotating chopper blade driven by motor 223. Die plate 221 is mounted in pelletizer chamber 224 which is filled with cooled pelletizer water for rapid cooling of the forming pellets. The pelletizer chamber 224 is fed with cooled water from refrigerated heat exchanger 225 via conduit 226.

The heat exchanger 225 is a tube-in-shell heat exchanger having an array of U-tubes (through which the cooling liquid flows) contained in a shell or kettle which is fed with liquid propylene as refrigerant through conduit 227 from a compressor (not shown). Propylene vapor exits the shell at outlet 228 for return to the compressor. The pellet cooling liquid enters the heat exchanger 225 via conduit 228 from the pellet cooling liquid tank (not shown in FIG. 2) which is described in more detail below. Refrigerated heat exchanger 225 cools the cooling liquid to 7° C. Optionally, the pellet cooling and conveying water may be cooled in a heat exchanger where the coolant may be a mixture of glycol and water at various proportions or other cold fluid which has itself been cooled in another refrigeration system. In some circumstances, such as when pelletizing more crystalline materials, it may be adequate to cool the pellet cooling and conveying water with just cooling tower water.

The polymer pellets formed in pelletizer chamber 224 are carried in the stream of cooling liquid flowing out of the chamber 224 via conduit 229 to the drying apparatus shown in FIG. 3.

Conduit 229 terminates at glob catcher 230. The pelletizer chamber 224 has a design pressure of 7 barg. The length of conduit 229 between pelletizer chamber 224 and the glob catcher 230 of the drying apparatus is 360 metres, with 90° elbows and a rise in elevation of 20 metres. That results in a pressure drop through the conduit 229 of less than 2.8 bar. The pressure change across the pelletizer chamber is 0.5 bar, so the inlet pressure to that chamber is less than 3.3 barg, which meets the design criteria of the chamber.

The drying section shown in FIG. 3 includes glob catcher 230, spin dryer 232 and a fluid bed dryer.

The conduit 229 is designed to provide a residence time of approximately 2.6 minutes to cool the pellets and to allow some crystallization time for the pellets to reduce the risk of plugging in the downstream operations. The concentration of pellets in the cooling liquid in the conduit 229 is 6%, and the temperature is about 15° C. to 17° C.

The conduit 229 rises in stages along its length from the pelletizer chamber 224 to the glob catcher 230, with no descending sections, in order to avoid the possibility of an air lock forming on filling of the system and furthermore in order to avoid segregation of polymer pellets. Conduit 229 is of 10" (25.4 cm) stainless steel pipe, insulated to reduce heat transfer and condensation on its external surface. Those skilled in the art will recognize that other pipe diameters, optionally between 2" (5.08 cm) and 8" (20.32 cm), and optionally between 4" (10.16 cm) and 6" (15.24 cm) may be used to maintain the velocity and prevent accumulation of pellets and plugging.

Inside the glob catcher 230 the mixture of pellets and cooling liquid flows through an upper, coarse, angled screen which separates large agglomerates from the pellets and cooling liquid. The agglomerates (globs) fall via a chute into tank 231. The pellets and cooling liquid fall onto a second lower screen which has a finer mesh and which separates the pellets from the cooling liquid. The wet pellets slide down the lower screen exiting the glob catcher 230 and entering the intake of spin dryer 232 via an angled chute. Glob catcher 230 and spin dryer 232 each have a capacity of 20 tph (tons per hour). The spin dryer 232 is provided with an outlet for air and water vapor which is drawn through the filter screen pack 247 by blower 248 before being vented at 249.

The cooling liquid streams from the glob catcher 230 and the spin dryer 232 flow via conduits under gravity and enter the lower part of calming drum 233.

The cooling liquid enters the lower part of calming drum 233 through two inlets, each located at the lower half of the drum. Calming drum 233 is a cylindrical vessel having a diameter of 1 meter and is arranged vertically. The calming drum has a single outlet in its upper part which leads via a flume to the top of flotation tank 234. The function of calming drum 233 is to reduce the turbulence of the separated cooling liquid streams before the combined stream enters the flotation tank 234.

The cooling liquid enters the top of flotation tank 234 tangentially through tangentially-arranged inlet 235, thereby generating a small vortex in the tank. Residual polymer particles contained in the cooling liquid float to the surface and migrate to the centre of the vortex where they are collected by a funnel-shaped outlet 237 provided at its upper edge with a circular weir 236 over which the water flows into the funnel-shaped outlet 237. Circular weir 236 has a level upper edge which is unnotched.

The flotation tank 234 is generally cylindrical with a diameter of 6 meters and a height of 5 meters and is arranged with its axis of rotation vertical so that the cross section in a horizontal plane is circular. That contrasts with conventional pellet cooling liquid tanks which are typically square or rectangular for ease of construction. The circular cross-sectional shape enhances the vortex formed in the cooling liquid by the tangential flow through inlet 235.

As can be seen in FIG. 3, the tangential inlet 235 is located at approximately the same level or just below the level of the circular weir 236 so that the water flowing in through inlet 235 enters at the level of the surface of the water in the tank. In that way, the residual polymer particles carried in the incoming cooling liquid only have to float up a short distance to reach the surface of the cooling liquid in flotation tank 234.

The pellet cooling liquid entering the funnel-shaped outlet 237 drains to a conduit which leads to a residual polymer particles removal screen package comprising a filter screen having a mesh size of 50 to 150 mesh. The filter screen is automatically flushed every few minutes to carry the residual polymer particles into a pellet water sump 239. The filtrate cooling liquid passing through the filter screen 238 falls into tank 240 from which it is pumped by pump 241 back to join the stream of cooling liquid from the spin dryer 232 which then enters the calming drum 233.

Demineralised make-up water and condensate drawn from elsewhere in the plant is also supplied to the flotation tank 234 through the calming drum 233 to provide make-up for loss, via evaporation and leakage.

Cooling liquid is drawn from the lower end of the flotation tank 234 via an outlet 242 and is pumped by a pump 243 back through conduit 228 to the refrigerated heat exchanger 225 and from there back to the pelletizer chamber 224. Outlet 242 from flotation tank 234 is shielded by baffle 244 which reduces the turbulence generated by the flow of water out through the outlet 242 and prevents funneling of water down from the surface.

The cooling liquid entering the tangential inlet 235 enters at a velocity of less than 1 meter per second and the velocity of the water within the flotation tank 234 is such as to allow polymer particles having diameters of 300 microns or greater to float to the surface of the water in the flotation tank and be captured by the funnel-shaped outlet 237.

The speed of the various pumps involved is controlled such that the flow rate of water through the funnel shaped outlet 237 is approximately 10% of the flow rate of the water entering through 235 such that 90% of the flow out of the tank leaves through outlet 242 in the bottom of the tank. By using the flotation tank to concentrate residual polymer particles at the surface of the water in the tank such that they may be preferentially captured by the surface funnel shaped outlet 237, it is possible to capture residual polymer particles efficiently whilst only needing to filter 10% of the water, thereby allowing filter package 238 to be of relatively small size.

The water flowing out of flotation tank 234 through outlet 242 is pumped by pump 243 through conduit 228 back to the refrigerated heat exchanger 225 for cooling the pellet water. An aqueous suspension of calcium stearate (25%) as a pelletization aid is pumped into conduit 228 from pelletization aid tank 245 by metering pump 246. Pelletization aid tank 245 is fed from shipping containers of calcium stearate slurry and is provided with a nitrogen inlet, to maintain an inert atmosphere in the tank, and a motor driven stirrer shaft for agitating the calcium stearate slurry. Pump 246 is a metering pump to accurately meter the calcium stearate slurry into the pellet water as it flows through conduit 228. Elsewhere in the pellet cooling liquid system a turbidity meter (not shown) is used to continuously monitor the concentration of calcium stearate within the cooling liquid. The pumping rate of pump 246 is continuously adjusted in order to keep the concentration of calcium stearate at a desired level which is dependent on the grade of polymer being manufactured but is usually within the range of 200 to 2000 ppm. The speed of the metering pump may alternatively be continuously adjusted based on the polymer production rate, to keep a set ratio of aid added to the polymer produced.

The concentration of the calcium stearate in the pellet water is chosen such that the level of calcium stearate deposited on the pellets and which is present in the pellets sent to the end user is within the specification for that polymer grade. Typically, the level of pelletization aid on the dried pellets is in the range 100 to 1000 ppm, for example, 200 to 500 ppm by weight. Preferably, the level of calcium stearate in the cooling liquid does not rise above 5000 ppm by weight in order to avoid foaming problems. The particle size of the calcium stearate in the pellet water should be small, preferably in the range of 3 to 50 microns, and preferably no larger than 25 microns, and more preferably less than 10 microns. In addition, a surfactant may be used to maintain the calcium stearate in suspension. Calcium stearate is not easily wetted by water and it is desirable to add any surfactant at an optimum level to avoid foaming in the pellet water system.

The pellets leaves spin dryer 232 through an outlet at its upper end and are then carried into the two stage fluid bed dryer 250 on a vibrating conveyor (not shown). Fluid bed dryer 250 has a capacity of 25 tonnes per hour of polymer pellets to allow some catch up capacity in the event of hold ups earlier in the process. The width of the fluidized bed conveyor is approximately two meters and the length of the bed through the dryers is approximately 7.6 meters. The vibrating conveyor housing is split into two separate sections corresponding to a first stage of the dryer 251 and a second stage 252. The leading part of the vibrating bed in the second stage is located underneath the end of the first stage bed so that pellets drop from that end of the first stage bed onto the leading part of the second stage conveyor and so on to the exit. The vibratory beds are arranged to vibrate with a stroke of between ½ inch (1.27 cm) and 1 inch (2.54 cm) to fluidize the polymer pellets as they pass through the dryers. Optionally, the angle of attack for each section of the vibratory bed may be independently adjustable such that the speed of the polymer pellets through each stage as well as its vertical displacement can be independently adjusted. A housing surrounds and defines the two drying zones. Optionally, each section of the vibrating conveyor may be housed separately in separate housings.

The fluid bed conveyors are perforated so that air can be blown through the moving pellets as they are bounced along the conveyors. Drying air for the fluid bed dryer apparatus 250 is provided by air conditioning means which includes an inertial separator 253, filter 254, refrigerated heat exchanger 255, heated heat exchanger 256, blower 257 and associated conduits for carrying the air between those components. Air is drawn in through the inertial separator 253, passes through filter pack 254 where dust and other impurities are filtered out, and is then cooled in heat exchanger 255 where it is cooled to a temperature between 5° C. and 10° C. Moisture in the air condenses in the condenser and flows as condensate out through conduit 258 where it joins the make up water system for the pellet cooling liquid. The cooled dehumidified air passes from refrigerated heat exchanger 255 into a heater in the form of heated heat exchanger 256 which warms the dehumidified air to a temperature of approximately 20° C. to 30° C. The warmed conditioned air then passes into the bottom of the second drying zone 252 of fluid bed dryer apparatus 250, and mingles therein with the polymer pellets. The air is then exhausted from the second fluid bed zone 252 via an outlet in the upper part of the housing of the fluid bed dryer apparatus. It then passes through filter pack 259, blower 260 and heated heat exchanger 261 before entering the lower section of the housing of the first drying zone 251 of the fluid bed dryer apparatus 250. The air is heated by heater 261 to a temperature in the range of 50° C. to 60° C., thereby increasing its drying capacity yet again before entering the first drying 251. After passing through the polymer particles in the first drying zone, the drying air leaves the drying dryer apparatus through an outlet in the upper part of the housing of first drying zone 251 and is drawn by blower 262 through filter pack 263 before being vented to the atmosphere at 249.

When in steady state operation the polymer pellets from spin dryer 232 pass in a steady stream into first fluid bed zone 251 of drying apparatus 250 where they are dried by the conditioned air at a temperature of 50° C. to 60° C. from heater 261. As they leave the first fluid bed zone 251 and pass into the second fluid bed zone 252 almost all of the water in the pellets has been removed. In the second fluid bed zone 252 the conditioned air entering from blower 257 removes any remaining water on the pellets and brings the polymer particles to a temperature which is very close to the ambient temperature and slightly above the dew point of the atmosphere surrounding the polymerization plant so that when the polymer particles leave second fluid bed zone 252 and are carried to downstream packaging operations, atmospheric moisture does not condense on those pellets. To further reduce the possibility of condensation of atmospheric moisture, hood 264 is provided over conveyor 262 which carries the pellets from the drying apparatus 250. Hood 264 is provided with conditioned air via conduit 263 which leads from the conditioning system blower 257 mentioned above.

Figure 4:
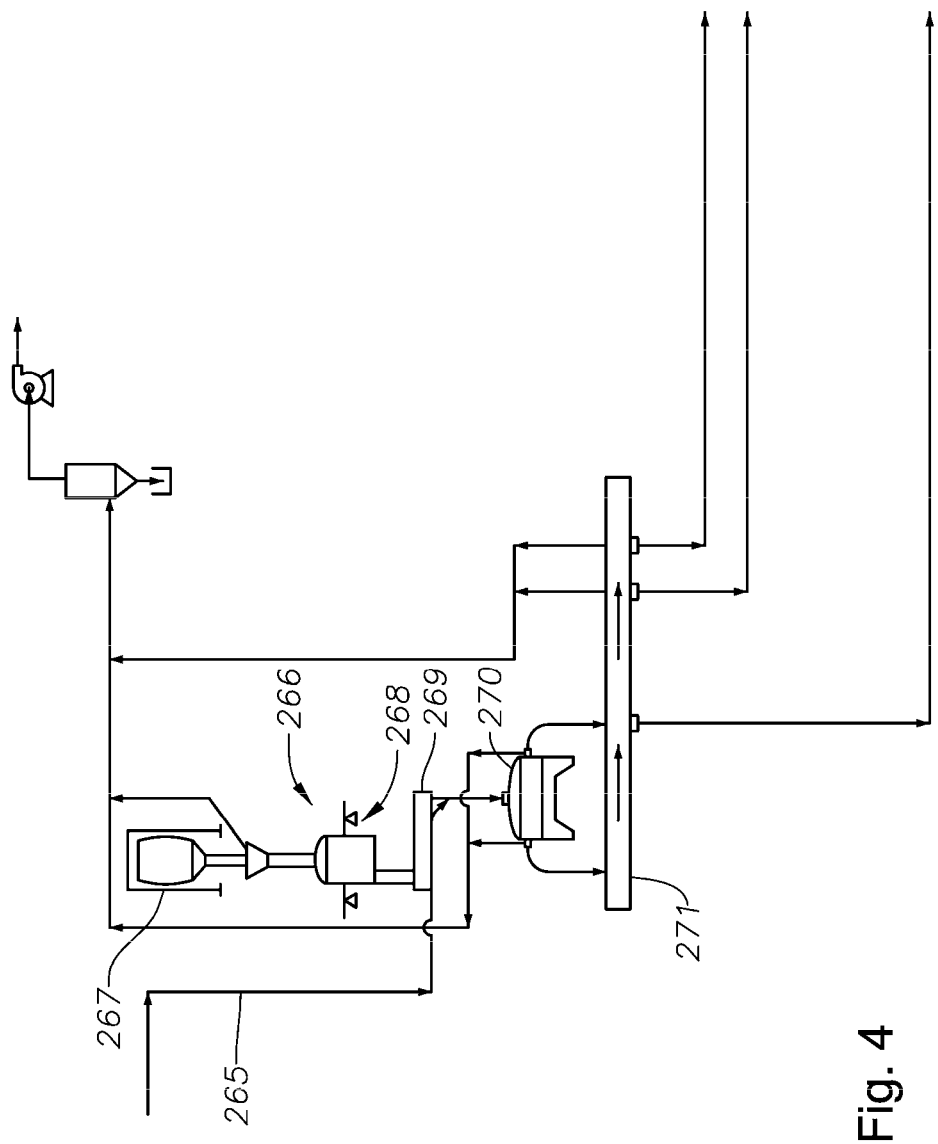
FIG. 4 shows schematically one embodiment of a pellet dusting device in an apparatus according to one embodiment.

The polymer pellets fall through perforations in the conveyor 262 and pass via chute 265 to the inlet of the pellet dusting apparatus (shown in FIG. 4).

The pellet dusting apparatus includes a supersack discharge station 267 mounted above a loss-in-weight powder feeder 268 which discharges to a screw feeder 269 which terminates at the inlet to the pellet dusting chamber 270. In use, a supersack of a pellet coating dust, typically a low density polyethylene dust, or optionally talc or calcium carbonate is mounted in the discharge station 267 and dust is supplied from the supersack to the loss-in-weight powder feeder 268 which supplies it at a measured rate via screw conveyor 269 to an inlet in the top of pellet dusting chamber 270. Pellets are delivered via conduit 265 to the same inlet and fall with the dusting powder into the dusting chamber 270, where they are stirred around on a circular vibratory screen, thereby becoming coated with the dust.

In one embodiment, the dusted pellets fall out of chamber 270 through two outlets located on opposite sides of the chamber down steeply angled take off ramps onto conveyor 271, which carries the pellets to various downstream packaging apparatus (not shown).

Figure 5:
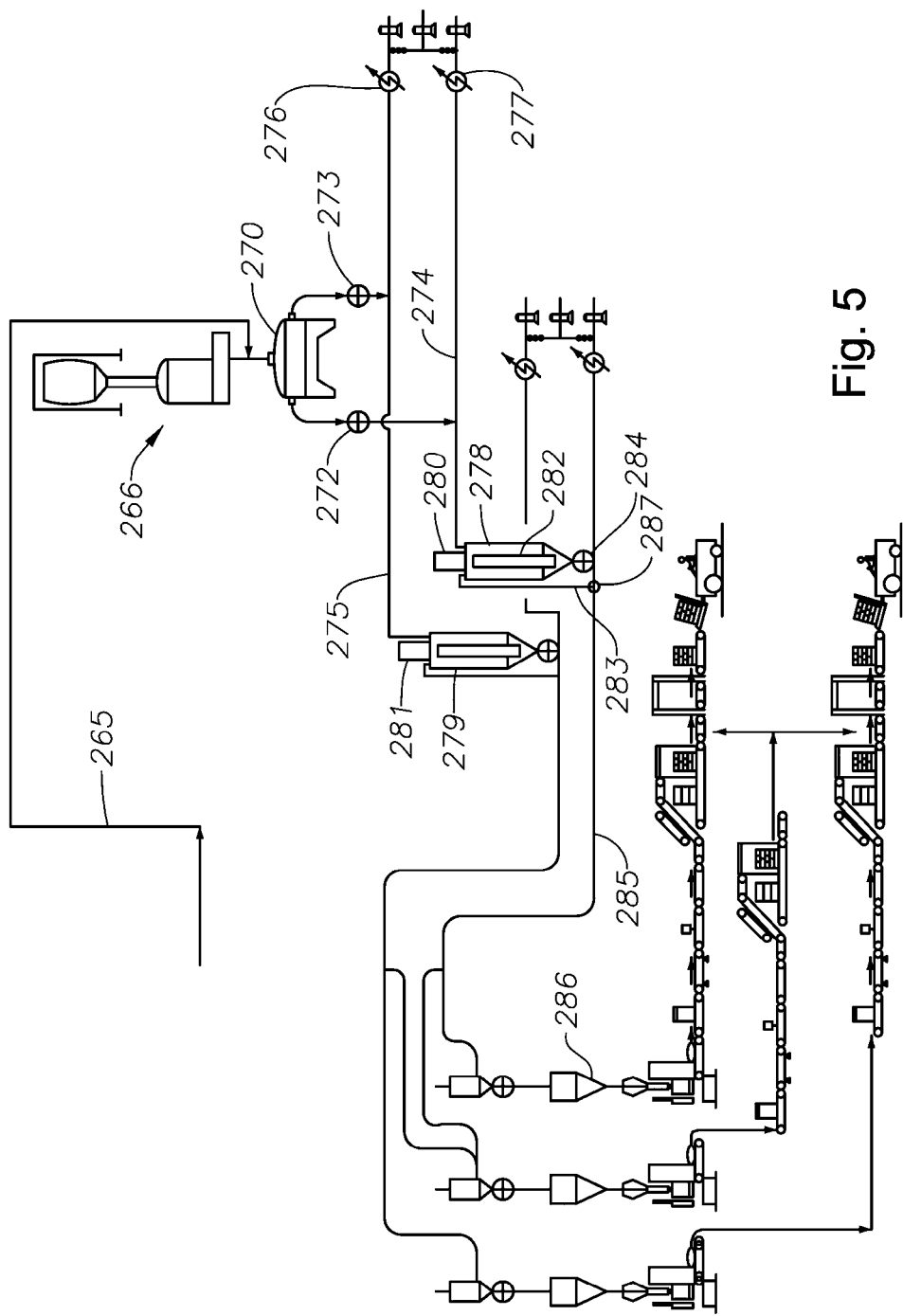
FIG. 5 shows schematically one embodiment of a pneumatic conveyor and silo system for carrying pellets from the pellet dusting device of FIG. 4 to a packaging apparatus according to one embodiment.

In another embodiment, shown in FIG. 5, the pellets fall from the outlets of dusting chamber 270 into two rotary inlet valves 272, 273 which acts as air locks for admitting the dusted pellets into a pneumatic conveyor lines 274, 275. The air locks 272, 273 are of the 'pellet' type with an inlet specifically designed to avoid cutting and smearing of the pellets. They are vented to relieve the air pressure in the valve pockets and the leakage gas from the rotary seals with the vented gas going to a dust collector (not shown). The rotary valves rotate at a speed such that the tip velocity is below 1 m/s, in order to avoid ignition of the dust.

The pneumatic conveyors are fed with conveying air from blowers (not shown). The air velocity at the pick up point is less than 25 m/s to avoid the formation of steamers or "angel hair". Before reaching the rotary air locks 272, 273, the air passes through air fin coolers (not shown) and then refrigerated heat exchangers 276, 277 which are fed with water at 7° C. from the pelletization water system, and which keeps the conveying air at a low temperature to avoid overheating and agglomeration of the pellets. The conveying air temperature is controlled via a hot gas bypass.

The conveying lines 274, 275 each have a capacity of 25 tonnes per hour and are designed to transport the pellets as a dilute phase because of the soft, poorly-flowing characteristics of the pellets. The enclosed nature of the conveyors prevents escape of the dust into the atmosphere.

The pneumatic conveyors 274, 275 each discharge into a silo 278, 279. The conveyor line length between each of the rotary air locks 272 and 273 and the corresponding outlet is less than 100 m. Each silo 278, 279 is provided at its upper extremity with a dust separation apparatus in the form of a bag filter through which the pneumatic conveying air is vented. Each bag filter 280, 281 is provided with an arrangement of jets, which periodically fire compressed air at the bag filters in order to dislodge accumulated LDPE dust, which falls back into the respective silo.

The silos 278, 279 are identical, and for reasons of clarity their structure and function will be described with reference to silo 278 only.

Silo 278 is a blender silo equipped with a central blender tube 282 and a re-circulation conduit 283, and is manufactured by Zeppelin GmbH (Germany). The silo 278 has an upper cylindrical section and a lower, inverted conical section, as is conventional for silos, and at the lowest extremity of the conical section an outlet feeds into rotary valve 284. The blender tube 282 extends vertically along the central axis of the silo from a position just above the silo outlet to a position just underneath the bag filter 280. The blender tube 282 has perforations along its length which are designed to admit pellets to the interior of the blender tube, where they fall downwards and exit the blender tube just above the outlet to the silo. In that way, the pellets which pass through the silo outlet are drawn from a number of levels in the bed of pellets within the silo rather than simply being drawn from the bottommost pellets of the bed.

Upon leaving the blender silo 278 the pellets fall into the rotary valve 284 which acts as an entry air lock for pneumatic conveyor 285, which is similar in design and operation to pneumatic conveyors 274, 274 described above. The conveyor 285 and a corresponding conveyor from silo 279 deliver the pellets to an array of three sack-filling machines designated generally as 286, where the pellets are filled into sacks, and stacked on pallets for transport to a warehouse area.

At a position of just downstream of rotary valve 284 the pneumatic conveyor 283 is provided with a diverter valve 287 which diverts at least a portion of the pellets flowing through conveyor 285 into re-circulation conduit 283 which delivers the pellets back to the top part of the silo 278. Conveyor 285, diverter valve 287 and conduit 283 form a re-circulation loop for re-circulating pellets flowing out the silo outlet back to the top of the silo. When the downstream array 286 of sack-filling machines are working at full capacity, the diverter valve 283 is set at a position such that the amount of pellets required to feed the sack filling machines continues down conveyor 285, and none or only a small fraction of the pellets flow is re-circulated to the top of the silo via conduit 283. When one of the sack filling machines is not working, for example, due to maintenance, the diverter valve 287 is adjusted so that the fraction of the pellet flow re-circulated to the top of the silo is increased correspondingly. When none of the sack-filling machines are working, the diverter valve 287 is set to divert the entire pellet flow back to the top of the blender silo 278. In that way, the flow from the silo outlet is uninterrupted and the pellets in the silo are constantly moved and are never in a stationary position, thereby minimizing the risk of agglomeration, bridging and blockage.

The silo 278 is designed to hold 25 tonnes of pellets. Under normal operation, the pellets have a residence time of 15 to 20 minutes in the silo 278 which provides additional crystallization time for soft, slowly crystallizing pellets before the pellets are packaged and stored, thereby reducing the chances of the pellets agglomerating on storage. The plant is designed to operate at a production level of 25 tonnes/hr of polymer, so during normal operation the pellets are delivered to each silo at a rate of 12.5 tonnes/hr, and the silos operate at about half full, thereby providing an extra surge capacity of 25-30 minutes to accommodate stoppages of the downstream array 286 of sack-filling machines.

In an alternative embodiment, the blender silo 278 is arranged immediately above a supersack/big bag filling machine, for filling supersacks or big bags. Each bag will take, for example, 900 kg of polymer.

Figure 6:
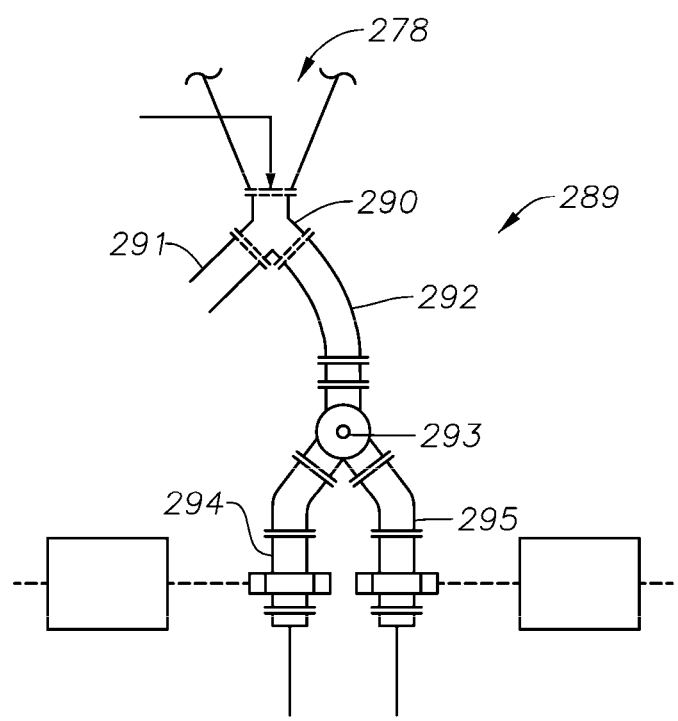
FIG. 6 shows one embodiment of a diverter valve for use in the blender silo in the apparatus according to one embodiment.

In this embodiment, the rotary valve at the bottom of the silo is replaced by a diverter valve mechanism 289 as shown in FIG. 6. The diverter valve mechanism 289 is located at the outlet of blender silo 278 and includes a first diverter valve 290 which communicates with a first conduit 291 and a second conduit 292. The first conduit 291 is a re-circulation conduit leading to the top of the silo. The second conduit 292 has an upper bent portion and a lower, vertical, straight portion which is provided at its lower end with a second diverter valve 293. The second diverter valve communicates with a third conduit 294, which leads to a first big bag filling station (not shown), and a fourth conduit 295, which leads to a second big bag filling station (not shown).

In operation, the pellets flow out of the silo 278 and into the first diverter valve 290. Diverter valve 290 can be set at any position, and therefore can send all of the flow of pellets to the first conduit, or all the flow to the second conduit, or any position in between. The second diverter valve 293 has two positions, and sends the pellets either to the third conduit 294, or to the fourth conduit 295. The first and second diverter valves are operated by a control mechanism, not shown, which is also connected to the first and second packaging stations.

When a supersack or big bag is being filled on the first big bag filling station the first diverter valve 290 is set at a position such that most, or all, of the pellet flow from the silo 278 is diverted into the second conduit 292, with none or only a small fraction of the pellet flow being sent to the first re-circulation conduit 291. The pellet flow through the second conduit is diverted into the third conduit 294 and from there falls to the first packaging station. When the weighing mechanism on the first packaging station indicates that the supersack or big bag is 90% full, the position of the first diverter valve 290 is adjusted so that 90% of the pellet flow from silo 278 is diverted to the first conduit 291 for re-circulation back to the top of the silo. The remaining 10% of flow continues through the second conduit 292, the second diverter valve 293 and the fourth conduit 294, as before. In that way the flow rate into the first packaging station is reduced to allow accurate filling of the supersack or big bag.

When the supersack or big bag is full, the position of the second diverter valve 293 is switched to divert the flow of pellets into the fourth conduit, through which they fall into a supersack or big bag which has been put in position by an operation on the second packaging station while filling took place at the first packaging station. At the same time, first diverter valve 290 is adjusted back to its original position so that most or all of the pellet flow is directed to the second conduit 292. While the big bag or supersack is being filled at the second station, the operator removed the full bag from the first station and puts a new big bag or supersack in position.

The diverter valves are designed to operate when filled with pellets and to be accurately adjustable. As can be seen from FIG. 6, the first and second conduits 291, 292 form an angle of 60° at the first diverter valve 290. Similarly, the third and fourth conduits 294, 295 form an angle of 60° at the second diverter valve 295. The use of the 60° angle, rather than more conventional 90° angle has been found to result in fewer blockage problems when dealing with soft pellets.

The use of the diverter valve mechanism 289 as described above allows for the efficient and accurate filling of large containers such as big bags and supersacks.

Polymerization of Differing Polymers

The operation of the plant can be best described with reference to Table 1. This takes as examples polymerization processes to make a low molecular weight plastomer (as described generally above); a higher molecular weight elastomer (as described above) and a high propylene content ethylene copolymer polymerized as described above.

To make plastomer in the plant of FIG. 1, the feed temperature is reduced by the chiller 6° C. to 0° C. Aluminum alkyl is added as scavenger in amounts appropriate to the poison content of the feed. Alternatively the process of WO 97/22635 (Turner et al.) incorporated herein by reference. The pressure is raised by the centrifugal pump to 120 bar. The feed comprising largely solvent and up to 50 bar partial pressure of ethylene and butene or hexene or octene comonomer then enters the first of the two series reactors 8. Catalyst and activator is added to the reactors 8 in amounts to create the desired polymerization temperature which in turn is related to the desired molecular weight. The heat of polymerization increases the temperature to 150° C. to 200° C. to form a plastomer without the use of hydrogen (although $H_2$ may be used). At the outlet of the second series reactor, the polymer concentration is in the range of from 15 wt % to 22 wt %. The general conditions may be as described in WO 99/45041 incorporated herein by reference.

Water is then supplied at 10 to kill the polymerization reaction which might otherwise continue in the presence of surviving catalyst, unreacted monomer, and elevated temperature.

The heat exchanger 12 raises the temperature initially and then the further heat exchanger 16 causes a further temperature rise to 220° C. A rapid pressure drop results as the polymerization mixture passes through the let-down valve 18 into the liquid phase separator, with the pressure dropping quickly from 100 bar to 40 bar. The pressure differential between that at the outlet of the pump 3 and the outlet of the let down valve 18 is solely responsible for causing the feed and the polymerization mixture to flow through the reactor 8 and the conduit 11 including the heat exchangers 12 and 16.

reactor operates at temperatures between 0° C. to 110° C. and the second reactor operates between 40° C. to 170° C. Preferably, the first reactor operates at temperatures between 10° C. to 100° C. and the second reactor operates between 50° C. to 150° C. More preferably, the first reactor operates at temperatures between 60° C. to 90° C. and the second reactor operates between 80° C. to 140° C. With appropriate control of process conditions and poison levels temperature of this order of magnitude can also be obtained where one reactor only is used or two reactors are used under the same process conditions.

The same can be said about the row in Table 1 marked "Predominant propylene content copolymer" where the temperature is lowered to allow the less reactive propylene monomer to form a sufficiently high molecular weight. The general conditions described in WO 00/01745, incorporated herein by reference, can be used. In the runs, the polymerization temperature varied between 28° C. and 70° C.

TABLE 1

Process Conditions of the Plant/Process in Varying Operating Modes

| | Feed Into Reactor | Polymerization Inside Reactor | Polymer Solution Upstream Let-Down Valve | Polymer Solution Downstream Let-Down Valve | Polymer Lean Phase | Polymer Rich Phase |
|---|---|---|---|---|---|---|
| Plastomer | 50 or down to −15° C.; 120 bar total; 50 bar monomer partial pressure. | 130 to 200° C.; 100 to 130 bar; 7-22 wt % polymer | 220° C.; 100 to 130 bar; 15-22 wt % polymer | 220° C.; 30 to 45bar; 15-22 wt % polymer | 220° C.; 30 to 45 bar; <0.3 wt % polymer | 220° C.; 30 to 40 bar; 25-40 wt % polymer |
| Elastomer | 50 or down to −15° C.; 120 bar total; 50 bar monomer partial pressure. | 85 to 150° C.; 100 to 130 bar; 8-15 wt % polymer | 220° C.; 100 to 130 bar; 8-15 wt % polymer | 220° C.; 30 to 45 bar; 8-15 wt % polymer | 220° C.; 30 to 45 bar; <0.3 wt % polymer | 220° C.; 30 to 40 bar; 25-40 wt % polymer |
| Predominant Propylene Content Copolymer | 50 or down to −35° C.; 120 bar total; 50 bar monomer partial pressure. | 50 or 80° C.; 100 to 130 bar; 5-15 wt % polymer | 200° C.; 100 bar to 130 bar; 5-15 wt % polymer | 200° C.; 30 to 45 bar; 5-15 wt % polymer | 200° C.; 30 to 45 bar; <0.3 wt % polymer | 220° C.; 30 to 40 bar; 20-40 wt % polymer |

Inside the liquid phase separator 14 an upper lean phase is formed with less than 0.1 wt % of polymer and a lower polymer-rich phase with 30 wt % to 40 wt % of polymer. The concentration is approximately double to triple that of the polymerization mixture fed to the separator (14). After further removal of solvent and monomer in the low-pressure flash tank (34) the polymer is pumped through gear pump 38 and molten stabilizer, octadeyl-3-(3,5-di-tertbutyl-4-hydroxyphenyl)-proportionate (Irganox™ 1076, m.p. 50-55° C.) is added at point 38a at a rate designed to give a concentration of stabilizer in the polymer of approximately 500 ppm. Immediately downstream of stabilizer addition point 38a, the polymer enters the devolatilizer 40. Polymer leaving the devolatilizer 40 may contain less than 1 wt %, preferably with 0.3 wt % or less, even more preferably <0.1 wt % of volatiles, including water.

If the use of the plant is now compared with the row in Table 1 marked elastomer, it can be seen that although the polymerization temperature is lower than for plastomer, and the polymer concentration emerging from the reactor is lower (its viscosity will be similar to that for plastomers), the same separation process and plant can be used to give an output which is somewhat lower (reflecting the reduced efficiency of the polymerization process at lower temperatures). With two reactors in series, the disclosure of WO 99/45047 (Harrington et al.) may be used, incorporated herein by reference. Generally speaking, in a series lay out it is preferable that the first While the process windows have been illustrated using prior art disclosures which suggest metallocene selection and the suitable operating window for a given polymer type, to the extent that prior published patent specifications are used to assist in such illustration, it should be kept in mind that these patent specifications did not provide the separation and recycle and purification conditions in a continuous plant with a recycle permitting full exploitation of the product capabilities of high activity metallocene catalyst systems at which the embodiments are best operated. The embodiments herein provide a plant and process which uses the given metallocene catalyst systems disclosed to make the target polymers at high metallocene activity, under a wide range of polymerization conditions and with considerable energy and investment savings.

All documents cited herein are fully incorporated by reference for all jurisdictions in which such incorporation is permitted and to the extent they are not inconsistent with this specification. All documents to which priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

What is claimed is:

1. A polymerization plant comprising:
    a reactor for polymerizing one or more monomers to form a polymer-containing polymerization reaction mixture;
    a separation system for the separation of volatile components from the polymer-containing reaction mixture to give a polymer;
    a pelletizer for injecting the polymer into cooling liquid in a chamber, thereby forming pellets;
    a drying apparatus to separate the pellets from the cooling liquid and dry them;
    a conduit for carrying the cooling liquid and pellets from the pelletizer chamber to the drying apparatus wherein the conduit has a length of at least 50 meters between the pelletizer chamber and the drying apparatus; and
    a heat exchange for maintaining the cooling liquid in the conduit at a temperature in the range of from 0 to 40° C;
    wherein the drying apparatus comprises:
        one or more conveyors to convey the pellets through a first drying zone for drying the pellets and then through a second drying zone for cooling the pellets arranged downstream of the first drying zone;
        conditioning means to produce conditioned air;
        a blower for blowing the conditioned air into the second drying zone to cool the pellets;
        a conduit for carrying the conditioned air from the second drying zone to the first drying zone; and
        a heater for heating the conditioned air passing through the conduit such that, in use, the temperature of the air in the first drying zone is higher than the temperature of the air in the second drying zone.

2. The polymerization plant of claim 1, further comprising:
    a dusting apparatus arranged to receive the pellets from the drying apparatus for applying a coating dust to the pellets; and
    a pneumatic conveyor for carrying the dusted pellets to a packaging apparatus, the pneumatic conveyor being provided with a cooling device for cooling the conveying air, the pneumatic conveyor also having an air lock for admitting the dusted pellets and an outlet for releasing the dusted pellets to the packaging apparatus.

3. The polymerization plant of claim 1, further comprising:
    a blender silo arranged to receive the pellets from the drying apparatus and being provided with re-circulation means to re-circulate the pellets in the silo; and
    a packaging device for packaging the pellets.

4. The polymerization plant of claim 1, further comprising:
    a silo having an inlet for receiving the polymer pellets from the drying apparatus and at the silo's lower extremity an outlet for releasing polymer pellets, which is provided with a diverter valve mechanism which allows a flow of polymer pellets out of the silo to be switchable between:
    a) a re-circulation loop to re-circulate polymer pellets to an upper part of the silo;
    b) a conduit leading to a first packaging station; and
    c) a conduit leading to a second packaging station.

5. The polymerization plant of claim 1, wherein the conduit is insulated.

6. The polymerization plant of claim 1, wherein the overall length of the conduit rises such that the end of the conduit at the drying apparatus is elevated with respect to the end of the conduit at the pelletizer.

7. The polymerization plant of claim 1, wherein the conduit is free of any section which descends in the direction from the pelletizer to the drying apparatus.

* * * * *